(12) United States Patent  (10) Patent No.: US 8,260,203 B2
Brantner  (45) Date of Patent: Sep. 4, 2012

(54) ENERGY DEVICE WITH INTEGRAL CONDUCTIVE SURFACE FOR DATA COMMUNICATION VIA ELECTROMAGNETIC ENERGY AND METHOD THEREOF

(75) Inventor: Paul C. Brantner, Conifer, CO (US)

(73) Assignee: Infinite Power Solutions, Inc., Littleton, CO (US)

(*) Notice: Subject to any disclaimer, the term of this patent is extended or adjusted under 35 U.S.C. 154(b) by 430 days.

(21) Appl. No.: 12/556,880

(22) Filed: Sep. 10, 2009

(65) Prior Publication Data

US 2010/0068995 A1  Mar. 18, 2010

Related U.S. Application Data

(60) Provisional application No. 61/096,415, filed on Sep. 12, 2008.

(51) Int. Cl.
*H04B 7/00* (2006.01)
(52) U.S. Cl. .............. 455/41.2; 455/404.1; 455/562.1; 235/487
(58) Field of Classification Search ............ 455/41.2, 455/404.1, 562.1, 410, 575.5, 107, 121; 235/487; 340/8.1; 343/860
See application file for complete search history.

(56) References Cited

U.S. PATENT DOCUMENTS

| | | | |
|---|---|---|---|
| 712,316 A | 10/1902 | Loppe et al. | |
| 2,970,180 A | 1/1961 | Urry | |
| 3,309,302 A | 3/1967 | Heil | |
| 3,616,403 A | 10/1971 | Collins et al. | |
| 3,790,432 A | 2/1974 | Fletcher et al. | |
| 3,797,091 A | 3/1974 | Gavin | |
| 3,850,604 A | 11/1974 | Klein | |
| 3,939,008 A | 2/1976 | Longo et al. | |
| 4,082,569 A | 4/1978 | Evans, Jr. | |
| 4,111,523 A | 9/1978 | Kaminow et al. | |
| 4,127,424 A | 11/1978 | Ullery, Jr. | |
| 4,226,924 A | 10/1980 | Kimura et al. | |
| 4,283,216 A | 8/1981 | Brereton | |
| 4,318,938 A | 3/1982 | Barnett et al. | |

(Continued)

FOREIGN PATENT DOCUMENTS

CN  1415124  4/2003

(Continued)

OTHER PUBLICATIONS

Sarro, P., "Silicon Carbide as a New MEMS Technology," Sensors and Actuators 82, 210-218 (2000).

(Continued)

*Primary Examiner* — Minh D Dao
(74) *Attorney, Agent, or Firm* — Fox Rothschild LLP; Jeff E. Schwartz

(57) ABSTRACT

An apparatus, method, and system to, for example, transmit and/or receive wireless signals is disclosed. The present invention uses, for example, electrically conductive surfaces within the energy device itself as a means of receiving and/or transmitting wireless communications signals. The surface may be an integral portion of the energy device, such as a charge collection surface within a battery or a capacitor that mainly provides the battery or a capacitor with a necessary function. In another embodiment of the invention the metallic or conductive surface is added to and specifically built into the energy device during manufacturing for the main purpose of receiving and/or transmitting wireless communications signals but is otherwise not necessary for the energy storage component.

55 Claims, 4 Drawing Sheets

U.S. PATENT DOCUMENTS

| | | | |
|---|---|---|---|
| 4,328,297 A | 5/1982 | Bilhorn | |
| 4,395,713 A * | 7/1983 | Nelson et al. | 343/713 |
| 4,437,966 A | 3/1984 | Hope et al. | |
| 4,442,144 A | 4/1984 | Pipkin | |
| 4,467,236 A | 8/1984 | Kolm et al. | |
| 4,481,265 A | 11/1984 | Ezawa et al. | |
| 4,518,661 A | 5/1985 | Rippere | |
| 4,555,456 A | 11/1985 | Kanehori et al. | |
| 4,572,873 A | 2/1986 | Kanehori et al. | |
| 4,587,225 A | 5/1986 | Tsukuma et al. | |
| 4,619,680 A | 10/1986 | Nourshargh et al. | |
| 4,645,726 A | 2/1987 | Hiratani et al. | |
| 4,664,993 A | 5/1987 | Sturgis et al. | |
| 4,668,593 A | 5/1987 | Sammells | |
| RE32,449 E | 6/1987 | Claussen | |
| 4,672,586 A | 6/1987 | Shimohigashi et al. | |
| 4,710,940 A | 12/1987 | Sipes, Jr. | |
| 4,728,588 A | 3/1988 | Noding et al. | |
| 4,740,431 A | 4/1988 | Little | |
| 4,756,717 A | 7/1988 | Sturgis et al. | |
| 4,785,459 A | 11/1988 | Baer | |
| 4,826,743 A | 5/1989 | Nazri | |
| 4,865,428 A | 9/1989 | Corrigan | |
| 4,878,094 A | 10/1989 | Balkanski | |
| 4,903,326 A | 2/1990 | Zakman et al. | |
| 4,915,810 A | 4/1990 | Kestigian et al. | |
| 4,964,877 A | 10/1990 | Keister et al. | |
| 4,977,007 A | 12/1990 | Kondo et al. | |
| 4,978,437 A | 12/1990 | Wirz | |
| 5,006,737 A | 4/1991 | Fay | |
| 5,019,467 A | 5/1991 | Fujiwara | |
| 5,030,331 A | 7/1991 | Sato | |
| 5,035,965 A | 7/1991 | Sangyoji et al. | |
| 5,055,704 A | 10/1991 | Link et al. | |
| 5,057,385 A | 10/1991 | Hope et al. | |
| 5,085,904 A | 2/1992 | Deak et al. | |
| 5,096,852 A | 3/1992 | Hobson | |
| 5,100,821 A | 3/1992 | Fay | |
| 5,107,538 A | 4/1992 | Benton et al. | |
| 5,110,694 A | 5/1992 | Nagasubramanian et al. | |
| 5,110,696 A | 5/1992 | Shokoohi et al. | |
| 5,119,269 A | 6/1992 | Nakayama | |
| 5,119,460 A | 6/1992 | Bruce et al. | |
| 5,124,782 A | 6/1992 | Hundt et al. | |
| 5,147,985 A | 9/1992 | DuBrucq | |
| 5,153,710 A | 10/1992 | McCain | |
| 5,169,408 A | 12/1992 | Biggerstaff et al. | |
| 5,171,413 A | 12/1992 | Arntz et al. | |
| 5,173,271 A | 12/1992 | Chen et al. | |
| 5,174,876 A | 12/1992 | Buchal et al. | |
| 5,180,645 A | 1/1993 | Moré | |
| 5,187,564 A | 2/1993 | McCain | |
| 5,196,041 A | 3/1993 | Tumminelli et al. | |
| 5,196,374 A | 3/1993 | Hundt et al. | |
| 5,200,029 A | 4/1993 | Bruce et al. | |
| 5,202,201 A | 4/1993 | Meunier et al. | |
| 5,206,925 A | 4/1993 | Nakazawa et al. | |
| 5,208,121 A | 5/1993 | Yahnke et al. | |
| 5,217,828 A | 6/1993 | Sangyoji et al. | |
| 5,221,891 A | 6/1993 | Janda et al. | |
| 5,225,288 A | 7/1993 | Beeson et al. | |
| 5,227,264 A | 7/1993 | Duval et al. | |
| 5,237,439 A | 8/1993 | Misono et al. | |
| 5,252,194 A | 10/1993 | Demaray et al. | |
| 5,262,254 A | 11/1993 | Koksbang et al. | |
| 5,273,608 A | 12/1993 | Nath | |
| 5,287,427 A | 2/1994 | Atkins et al. | |
| 5,296,089 A | 3/1994 | Chen et al. | |
| 5,300,461 A | 4/1994 | Ting | |
| 5,302,474 A | 4/1994 | Shackle et al. | |
| 5,303,319 A | 4/1994 | Ford et al. | |
| 5,306,569 A | 4/1994 | Hiraki | |
| 5,307,240 A | 4/1994 | McMahon | |
| 5,309,302 A | 5/1994 | Vollmann | |
| 5,314,765 A | 5/1994 | Bates | |
| 5,326,652 A | 7/1994 | Lake | |
| 5,326,653 A | 7/1994 | Chang | |
| 5,338,624 A | 8/1994 | Gruenstern et al. | |
| 5,338,625 A | 8/1994 | Bates et al. | |
| 5,342,709 A | 8/1994 | Yahnke et al. | |
| 5,355,089 A | 10/1994 | Treger et al. | |
| 5,360,686 A | 11/1994 | Peled et al. | |
| 5,362,579 A | 11/1994 | Rossoll et al. | |
| 5,381,262 A | 1/1995 | Arima et al. | |
| 5,387,482 A | 2/1995 | Anani | |
| 5,401,595 A | 3/1995 | Kagawa et al. | |
| 5,403,680 A | 4/1995 | Otagawa et al. | |
| 5,411,537 A | 5/1995 | Munshi et al. | |
| 5,411,592 A | 5/1995 | Ovshinsky et al. | |
| 5,419,982 A | 5/1995 | Tura et al. | |
| 5,427,669 A | 6/1995 | Drummond | |
| 5,435,826 A | 7/1995 | Sakakibara et al. | |
| 5,437,692 A | 8/1995 | Dasgupta et al. | |
| 5,445,856 A | 8/1995 | Chaloner-Gill | |
| 5,445,906 A | 8/1995 | Hobson et al. | |
| 5,448,110 A | 9/1995 | Tuttle et al. | |
| 5,449,576 A | 9/1995 | Anani | |
| 5,455,126 A | 10/1995 | Bates et al. | |
| 5,457,569 A | 10/1995 | Liou et al. | |
| 5,458,995 A | 10/1995 | Behl et al. | |
| 5,464,692 A | 11/1995 | Huber | |
| 5,464,706 A | 11/1995 | Dasgupta et al. | |
| 5,470,396 A | 11/1995 | Mongon et al. | |
| 5,472,795 A | 12/1995 | Atita | |
| 5,475,528 A | 12/1995 | LaBorde | |
| 5,478,456 A | 12/1995 | Humpal et al. | |
| 5,483,613 A | 1/1996 | Bruce et al. | |
| 5,493,177 A | 2/1996 | Muller et al. | |
| 5,498,489 A | 3/1996 | Dasgupta et al. | |
| 5,499,207 A | 3/1996 | Miki et al. | |
| 5,501,918 A | 3/1996 | Gruenstern et al. | |
| 5,504,041 A | 4/1996 | Summerfelt | |
| 5,512,147 A | 4/1996 | Bates et al. | |
| 5,512,387 A | 4/1996 | Ovshinsky | |
| 5,512,389 A | 4/1996 | Dasgupta et al. | |
| 5,538,796 A | 7/1996 | Schaffer et al. | |
| 5,540,742 A | 7/1996 | Sangyoji et al. | |
| 5,547,780 A | 8/1996 | Kagawa et al. | |
| 5,547,782 A | 8/1996 | Dasgupta et al. | |
| 5,552,242 A | 9/1996 | Ovshinsky et al. | |
| 5,555,127 A | 9/1996 | Abdelkader et al. | |
| 5,561,004 A | 10/1996 | Bates et al. | |
| 5,563,979 A | 10/1996 | Bruce et al. | |
| 5,565,071 A | 10/1996 | Demaray et al. | |
| 5,567,210 A | 10/1996 | Bates et al. | |
| 5,569,520 A | 10/1996 | Bates | |
| 5,582,935 A | 12/1996 | Dasgupta et al. | |
| 5,591,520 A | 1/1997 | Migliorini et al. | |
| 5,597,660 A | 1/1997 | Bates et al. | |
| 5,597,661 A | 1/1997 | Takeuchi et al. | |
| 5,599,355 A | 2/1997 | Nagasubramanian et al. | |
| 5,601,952 A | 2/1997 | Dasgupta et al. | |
| 5,603,816 A | 2/1997 | Demaray et al. | |
| 5,607,560 A | 3/1997 | Hirabayashi et al. | |
| 5,607,789 A | 3/1997 | Treger et al. | |
| 5,612,152 A | 3/1997 | Bates et al. | |
| 5,612,153 A | 3/1997 | Moulton et al. | |
| 5,613,995 A | 3/1997 | Bhandarkar et al. | |
| 5,616,933 A | 4/1997 | Li | |
| 5,618,382 A | 4/1997 | Mintz et al. | |
| 5,625,202 A | 4/1997 | Chai | |
| 5,637,418 A | 6/1997 | Brown et al. | |
| 5,643,480 A | 7/1997 | Gustavsson et al. | |
| 5,644,207 A | 7/1997 | Lew et al. | |
| 5,645,626 A | 7/1997 | Edlund et al. | |
| 5,645,960 A | 7/1997 | Scrosati et al. | |
| 5,654,054 A | 8/1997 | Tropsha et al. | |
| 5,654,984 A | 8/1997 | Hershbarger et al. | |
| 5,658,652 A | 8/1997 | Sellergren | |
| 5,660,700 A | 8/1997 | Shimizu et al. | |
| 5,665,490 A | 9/1997 | Takeuchi et al. | |
| 5,667,538 A | 9/1997 | Bailey | |
| 5,677,784 A | 10/1997 | Harris | |
| 5,679,980 A | 10/1997 | Summerfelt | |
| 5,681,666 A | 10/1997 | Treger et al. | |
| 5,686,360 A | 11/1997 | Harvey, III et al. | |
| 5,689,522 A | 11/1997 | Beach | |

| Patent No. | Date | Name |
|---|---|---|
| 5,693,956 A | 12/1997 | Shi et al. |
| 5,702,829 A | 12/1997 | Paidassi et al. |
| 5,705,293 A | 1/1998 | Hobson |
| 5,716,728 A | 2/1998 | Smesko |
| 5,718,813 A | 2/1998 | Drummond et al. |
| 5,719,976 A | 2/1998 | Henry et al. |
| 5,721,067 A | 2/1998 | Jacobs et al. |
| RE35,746 E | 3/1998 | Lake |
| 5,731,661 A | 3/1998 | So et al. |
| 5,738,731 A | 4/1998 | Shindo et al. |
| 5,742,094 A | 4/1998 | Ting |
| 5,755,938 A | 5/1998 | Fukui et al. |
| 5,755,940 A | 5/1998 | Shindo |
| 5,757,126 A | 5/1998 | Harvey, III et al. |
| 5,762,768 A | 6/1998 | Goy et al. |
| 5,763,058 A | 6/1998 | Isen et al. |
| 5,771,562 A | 6/1998 | Harvey, III et al. |
| 5,776,278 A | 7/1998 | Tuttle et al. |
| 5,779,839 A | 7/1998 | Tuttle et al. |
| 5,790,489 A | 8/1998 | O'Connor |
| 5,792,550 A | 8/1998 | Phillips et al. |
| 5,805,223 A | 9/1998 | Shikakura et al. |
| 5,811,177 A | 9/1998 | Shi et al. |
| 5,814,195 A | 9/1998 | Lehan et al. |
| 5,830,330 A | 11/1998 | Lantsman |
| 5,831,262 A | 11/1998 | Greywall et al. |
| 5,834,137 A | 11/1998 | Zhang et al. |
| 5,841,931 A | 11/1998 | Foresi et al. |
| 5,842,118 A | 11/1998 | Wood, Jr. |
| 5,845,990 A | 12/1998 | Hymer |
| 5,847,865 A | 12/1998 | Gopinath et al. |
| 5,849,163 A | 12/1998 | Ichikawa et al. |
| 5,851,896 A | 12/1998 | Summerfelt |
| 5,853,830 A | 12/1998 | McCaulley et al. |
| 5,855,744 A | 1/1999 | Halsey et al. |
| 5,856,705 A | 1/1999 | Ting |
| 5,864,182 A | 1/1999 | Matsuzaki |
| 5,865,860 A | 2/1999 | Delnick |
| 5,870,273 A | 2/1999 | Sogabe et al. |
| 5,874,184 A | 2/1999 | Takeuchi et al. |
| 5,882,721 A | 3/1999 | Delnick |
| 5,882,946 A | 3/1999 | Otani |
| 5,889,383 A | 3/1999 | Teich |
| 5,895,731 A | 4/1999 | Clingempeel |
| 5,897,522 A | 4/1999 | Nitzan |
| 5,900,057 A | 5/1999 | Buchal et al. |
| 5,909,346 A | 6/1999 | Malhotra et al. |
| 5,916,704 A | 6/1999 | Lewin et al. |
| 5,923,964 A | 7/1999 | Li |
| 5,930,046 A | 7/1999 | Solberg et al. |
| 5,930,584 A | 7/1999 | Sun et al. |
| 5,942,089 A | 8/1999 | Sproul et al. |
| 5,948,215 A | 9/1999 | Lantsmann |
| 5,948,464 A | 9/1999 | Delnick |
| 5,948,562 A | 9/1999 | Fulcher et al. |
| 5,952,778 A | 9/1999 | Haskal et al. |
| 5,955,217 A | 9/1999 | Lerberghe |
| 5,961,672 A | 10/1999 | Skotheim et al. |
| 5,961,682 A | 10/1999 | Lee et al. |
| 5,966,491 A | 10/1999 | DiGiovanni |
| 5,970,393 A | 10/1999 | Khorrami et al. |
| 5,973,913 A | 10/1999 | McEwen et al. |
| 5,977,582 A | 11/1999 | Flemming et al. |
| 5,982,144 A | 11/1999 | Johnson et al. |
| 5,985,484 A | 11/1999 | Young et al. |
| 5,985,485 A | 11/1999 | Ovshinsky et al. |
| 6,000,603 A | 12/1999 | Koskenmaki et al. |
| 6,001,224 A | 12/1999 | Drummond et al. |
| 6,004,660 A | 12/1999 | Topolski et al. |
| 6,007,945 A | 12/1999 | Jacobs et al. |
| 6,013,949 A | 1/2000 | Tuttle |
| 6,019,284 A | 2/2000 | Freeman et al. |
| 6,023,610 A | 2/2000 | Wood, Jr. |
| 6,024,844 A | 2/2000 | Drummond et al. |
| 6,025,094 A | 2/2000 | Visco et al. |
| 6,028,990 A | 2/2000 | Shahani et al. |
| 6,030,421 A | 2/2000 | Gauthier et al. |
| 6,033,768 A | 3/2000 | Muenz et al. |
| 6,042,965 A | 3/2000 | Nestler et al. |
| 6,045,626 A | 4/2000 | Yano et al. |
| 6,045,652 A | 4/2000 | Tuttle et al. |
| 6,045,942 A | 4/2000 | Miekka et al. |
| 6,046,081 A | 4/2000 | Kuo |
| 6,046,514 A | 4/2000 | Rouillard et al. |
| 6,048,372 A | 4/2000 | Mangahara et al. |
| 6,051,114 A | 4/2000 | Yao et al. |
| 6,051,296 A | 4/2000 | McCaulley et al. |
| 6,052,397 A | 4/2000 | Jeon et al. |
| 6,057,557 A | 5/2000 | Ichikawa |
| 6,058,233 A | 5/2000 | Dragone |
| 6,071,323 A | 6/2000 | Kawaguchi |
| 6,075,973 A | 6/2000 | Greeff et al. |
| 6,077,106 A | 6/2000 | Mish |
| 6,077,642 A | 6/2000 | Ogata et al. |
| 6,078,791 A | 6/2000 | Tuttle et al. |
| 6,080,508 A | 6/2000 | Dasgupta et al. |
| 6,080,643 A | 6/2000 | Noguchi et al. |
| 6,093,944 A | 7/2000 | VanDover |
| 6,094,292 A | 7/2000 | Goldner et al. |
| 6,096,569 A | 8/2000 | Matsuno et al. |
| 6,100,108 A | 8/2000 | Mizuno et al. |
| 6,106,933 A | 8/2000 | Nagai et al. |
| 6,110,531 A | 8/2000 | Paz De Araujo |
| 6,115,616 A | 9/2000 | Halperin et al. |
| 6,117,279 A | 9/2000 | Smolanoff et al. |
| 6,118,426 A | 9/2000 | Albert et al. |
| 6,120,890 A | 9/2000 | Chen et al. |
| 6,129,277 A | 10/2000 | Grant et al. |
| 6,133,670 A | 10/2000 | Rodgers et al. |
| 6,137,671 A | 10/2000 | Staffiere |
| 6,144,916 A | 11/2000 | Wood, Jr. et al. |
| 6,146,225 A | 11/2000 | Sheats et al. |
| 6,148,503 A | 11/2000 | Delnick et al. |
| 6,156,452 A | 12/2000 | Kozuki et al. |
| 6,157,765 A | 12/2000 | Bruce et al. |
| 6,159,635 A | 12/2000 | Dasgupta et al. |
| 6,160,373 A | 12/2000 | Dunn et al. |
| 6,162,709 A | 12/2000 | Raoux et al. |
| 6,165,566 A | 12/2000 | Tropsha |
| 6,168,884 B1 | 1/2001 | Neudecker et al. |
| 6,169,474 B1 | 1/2001 | Greeff et al. |
| 6,175,075 B1 | 1/2001 | Shiotsuka et al. |
| 6,176,986 B1 | 1/2001 | Watanabe et al. |
| 6,181,283 B1 | 1/2001 | Johnson et al. |
| 6,192,222 B1 | 2/2001 | Greeff et al. |
| 6,197,167 B1 | 3/2001 | Tanaka |
| 6,198,217 B1 | 3/2001 | Suzuki et al. |
| 6,204,111 B1 | 3/2001 | Uemoto et al. |
| 6,210,544 B1 | 4/2001 | Sasaki |
| 6,210,832 B1 | 4/2001 | Visco et al. |
| 6,214,061 B1 | 4/2001 | Visco et al. |
| 6,214,660 B1 | 4/2001 | Uemoto et al. |
| 6,218,049 B1 | 4/2001 | Bates et al. |
| 6,220,516 B1 | 4/2001 | Tuttle et al. |
| 6,223,317 B1 | 4/2001 | Pax et al. |
| 6,228,532 B1 | 5/2001 | Tsuji et al. |
| 6,229,987 B1 | 5/2001 | Greeff et al. |
| 6,232,242 B1 | 5/2001 | Hata et al. |
| 6,235,432 B1 | 5/2001 | Kono et al. |
| 6,236,793 B1 | 5/2001 | Lawrence et al. |
| 6,242,128 B1 | 6/2001 | Tura et al. |
| 6,242,129 B1 | 6/2001 | Johnson |
| 6,242,132 B1 | 6/2001 | Neudecker et al. |
| 6,248,291 B1 | 6/2001 | Nakagama et al. |
| 6,248,481 B1 | 6/2001 | Visco et al. |
| 6,248,640 B1 | 6/2001 | Nam |
| 6,249,222 B1 | 6/2001 | Gehlot |
| 6,252,564 B1 | 6/2001 | Albert et al. |
| 6,258,252 B1 | 7/2001 | Miyasaka et al. |
| 6,261,917 B1 | 7/2001 | Quek et al. |
| 6,264,709 B1 | 7/2001 | Yoon et al. |
| 6,265,652 B1 | 7/2001 | Kurata et al. |
| 6,268,695 B1 | 7/2001 | Affinito |
| 6,271,053 B1 | 8/2001 | Kondo |
| 6,271,793 B1 | 8/2001 | Brady et al. |
| 6,271,801 B2 | 8/2001 | Tuttle et al. |
| 6,280,585 B1 | 8/2001 | Obinata |
| 6,280,875 B1 | 8/2001 | Kwak et al. |

| | | |
|---|---|---|
| 6,281,142 B1 | 8/2001 | Basceri |
| 6,284,406 B1 | 9/2001 | Xing et al. |
| 6,287,986 B1 | 9/2001 | Mihara |
| 6,289,209 B1 | 9/2001 | Wood, Jr. |
| 6,290,821 B1 | 9/2001 | McLeod |
| 6,290,822 B1 | 9/2001 | Fleming et al. |
| 6,291,098 B1 | 9/2001 | Shibuya et al. |
| 6,294,722 B1 | 9/2001 | Kondo et al. |
| 6,296,949 B1 | 10/2001 | Bergstresser et al. |
| 6,296,967 B1 | 10/2001 | Jacobs et al. |
| 6,296,971 B1 | 10/2001 | Hara |
| 6,300,215 B1 | 10/2001 | Shin |
| 6,302,939 B1 | 10/2001 | Rabin |
| 6,306,265 B1 | 10/2001 | Fu et al. |
| 6,316,563 B2 | 11/2001 | Naijo et al. |
| 6,323,416 B1 | 11/2001 | Komori et al. |
| 6,324,211 B1 | 11/2001 | Ovard et al. |
| 6,325,294 B2 | 12/2001 | Tuttle et al. |
| 6,329,213 B1 | 12/2001 | Tuttle et al. |
| 6,339,236 B1 | 1/2002 | Tomii et al. |
| 6,340,880 B1 | 1/2002 | Higashijima et al. |
| 6,344,366 B1 | 2/2002 | Bates |
| 6,344,419 B1 | 2/2002 | Forster et al. |
| 6,344,795 B1 | 2/2002 | Gehlot |
| 6,350,353 B2 | 2/2002 | Gopalraja et al. |
| 6,351,630 B2 | 2/2002 | Wood, Jr. |
| 6,356,230 B1 | 3/2002 | Greeff et al. |
| 6,356,694 B1 | 3/2002 | Weber |
| 6,356,764 B1 | 3/2002 | Ovard et al. |
| 6,358,810 B1 | 3/2002 | Dornfest et al. |
| 6,360,954 B1 | 3/2002 | Barnardo |
| 6,361,662 B1 | 3/2002 | Chiba et al. |
| 6,365,300 B1 | 4/2002 | Ota et al. |
| 6,365,319 B1 | 4/2002 | Heath et al. |
| 6,368,275 B1 | 4/2002 | Sliwa et al. |
| 6,369,316 B1 | 4/2002 | Plessing et al. |
| 6,372,383 B1 | 4/2002 | Lee et al. |
| 6,372,386 B1 | 4/2002 | Cho et al. |
| 6,373,224 B1 | 4/2002 | Goto et al. |
| 6,375,780 B1 | 4/2002 | Tuttle et al. |
| 6,376,027 B1 | 4/2002 | Lee et al. |
| 6,379,835 B1 | 4/2002 | Kucherovsky et al. |
| 6,379,842 B1 | 4/2002 | Mayer |
| 6,379,846 B1 | 4/2002 | Terahara et al. |
| 6,380,477 B1 | 4/2002 | Curtin |
| 6,384,573 B1 | 5/2002 | Dunn |
| 6,387,563 B1 | 5/2002 | Bates |
| 6,391,166 B1 | 5/2002 | Wang |
| 6,392,565 B1 | 5/2002 | Brown |
| 6,394,598 B1 | 5/2002 | Kaiser |
| 6,395,430 B1 | 5/2002 | Cho et al. |
| 6,396,001 B1 | 5/2002 | Nakamura |
| 6,398,824 B1 | 6/2002 | Johnson |
| 6,399,241 B1 | 6/2002 | Hara et al. |
| 6,402,039 B1 | 6/2002 | Freeman et al. |
| 6,402,795 B1 | 6/2002 | Chu et al. |
| 6,402,796 B1 | 6/2002 | Johnson |
| 6,409,965 B1 | 6/2002 | Nagata et al. |
| 6,413,284 B1 | 7/2002 | Chu et al. |
| 6,413,285 B1 | 7/2002 | Chu et al. |
| 6,413,382 B1 | 7/2002 | Wang et al. |
| 6,413,645 B1 | 7/2002 | Graff et al. |
| 6,413,676 B1 | 7/2002 | Munshi |
| 6,414,626 B1 | 7/2002 | Greeff et al. |
| 6,416,598 B1 | 7/2002 | Sircar |
| 6,420,961 B1 | 7/2002 | Bates et al. |
| 6,422,698 B2 | 7/2002 | Kaiser |
| 6,423,106 B1 | 7/2002 | Bates |
| 6,423,776 B1 | 7/2002 | Akkapeddi et al. |
| 6,426,163 B1 | 7/2002 | Pasquier et al. |
| 6,432,577 B1 | 8/2002 | Shul et al. |
| 6,432,584 B1 | 8/2002 | Visco et al. |
| 6,433,380 B2 | 8/2002 | Shin |
| 6,433,465 B1 | 8/2002 | McKnight et al. |
| 6,436,156 B1 | 8/2002 | Wandeloski et al. |
| 6,437,231 B2 | 8/2002 | Kurata et al. |
| 6,444,336 B1 | 9/2002 | Jia et al. |
| 6,444,355 B1 | 9/2002 | Murai et al. |
| 6,444,368 B1 | 9/2002 | Hikmet et al. |

| | | | |
|---|---|---|---|
| 6,444,750 B1 | 9/2002 | Touhsaent | |
| 6,459,418 B1 | 10/2002 | Comiskey et al. | |
| 6,459,726 B1 | 10/2002 | Ovard et al. | |
| 6,466,771 B2 | 10/2002 | Wood, Jr. | |
| 6,475,668 B1 | 11/2002 | Hosokawa et al. | |
| 6,480,699 B1 * | 11/2002 | Lovoi | 455/41.2 |
| 6,481,623 B1 | 11/2002 | Grant et al. | |
| 6,488,822 B1 | 12/2002 | Moslehi | |
| 6,494,999 B1 | 12/2002 | Herrera et al. | |
| 6,495,283 B1 | 12/2002 | Yoon et al. | |
| 6,497,598 B2 | 12/2002 | Affinito | |
| 6,500,287 B1 | 12/2002 | Azens et al. | |
| 6,503,661 B1 | 1/2003 | Park et al. | |
| 6,503,831 B2 | 1/2003 | Speakman | |
| 6,506,289 B2 | 1/2003 | Demaray et al. | |
| 6,511,516 B1 | 1/2003 | Johnson et al. | |
| 6,511,615 B1 | 1/2003 | Dawes et al. | |
| 6,517,968 B2 | 2/2003 | Johnson et al. | |
| 6,522,067 B1 | 2/2003 | Graff et al. | |
| 6,524,466 B1 | 2/2003 | Bonaventura et al. | |
| 6,524,750 B1 | 2/2003 | Mansuetto | |
| 6,525,976 B1 | 2/2003 | Johnson | |
| 6,528,212 B1 | 3/2003 | Kusumoto et al. | |
| 6,529,827 B1 | 3/2003 | Beason et al. | |
| 6,533,907 B2 | 3/2003 | Demaray et al. | |
| 6,537,428 B1 | 3/2003 | Xiong et al. | |
| 6,538,211 B2 | 3/2003 | St. Lawrence et al. | |
| 6,541,147 B1 | 4/2003 | McLean et al. | |
| 6,548,912 B1 | 4/2003 | Graff et al. | |
| 6,551,745 B2 | 4/2003 | Moutsios et al. | |
| 6,558,836 B1 | 5/2003 | Whitacre et al. | |
| 6,562,513 B1 | 5/2003 | Takeuchi et al. | |
| 6,563,998 B1 | 5/2003 | Farah et al. | |
| 6,569,564 B1 | 5/2003 | Lane | |
| 6,569,570 B2 | 5/2003 | Sonobe et al. | |
| 6,570,325 B2 | 5/2003 | Graff et al. | |
| 6,572,173 B2 | 6/2003 | Muller | |
| 6,573,652 B1 | 6/2003 | Graff et al. | |
| 6,576,546 B2 | 6/2003 | Gilbert et al. | |
| 6,579,728 B2 | 6/2003 | Grant et al. | |
| 6,582,480 B2 | 6/2003 | Pasquier et al. | |
| 6,582,481 B1 | 6/2003 | Erbil | |
| 6,582,852 B1 | 6/2003 | Gao et al. | |
| 6,589,299 B2 | 7/2003 | Missling et al. | |
| 6,593,150 B2 | 7/2003 | Ramberg et al. | |
| 6,599,662 B1 | 7/2003 | Chiang et al. | |
| 6,600,905 B2 | 7/2003 | Greeff et al. | |
| 6,602,338 B2 | 8/2003 | Chen et al. | |
| 6,603,139 B1 | 8/2003 | Tessler et al. | |
| 6,603,391 B1 | 8/2003 | Greeff et al. | |
| 6,605,228 B1 | 8/2003 | Kawaguchi et al. | |
| 6,608,464 B1 | 8/2003 | Lew et al. | |
| 6,608,470 B1 | 8/2003 | Oglesbee et al. | |
| 6,610,440 B1 | 8/2003 | LaFollette et al. | |
| 6,615,614 B1 | 9/2003 | Makikawa et al. | |
| 6,616,035 B2 | 9/2003 | Ehrensvard et al. | |
| 6,618,829 B2 | 9/2003 | Pax et al. | |
| 6,620,545 B2 | 9/2003 | Goenka et al. | |
| 6,622,049 B2 | 9/2003 | Penner et al. | |
| 6,632,563 B1 | 10/2003 | Krasnov et al. | |
| 6,637,906 B2 | 10/2003 | Knoerzer et al. | |
| 6,637,916 B2 | 10/2003 | Mullner | |
| 6,639,578 B1 | 10/2003 | Comiskey et al. | |
| 6,642,895 B2 * | 11/2003 | Zurcher et al. | 343/718 |
| 6,645,675 B1 | 11/2003 | Munshi | |
| 6,650,000 B2 | 11/2003 | Ballantine et al. | |
| 6,650,942 B2 | 11/2003 | Howard et al. | |
| 6,662,430 B2 | 12/2003 | Brady et al. | |
| 6,664,006 B1 | 12/2003 | Munshi | |
| 6,673,484 B2 | 1/2004 | Matsuura | |
| 6,673,716 B1 | 1/2004 | D'Couto et al. | |
| 6,674,159 B1 | 1/2004 | Peterson et al. | |
| 6,677,070 B2 | 1/2004 | Kearl | |
| 6,683,244 B2 | 1/2004 | Fujimori et al. | |
| 6,683,749 B2 | 1/2004 | Daby et al. | |
| 6,686,096 B1 | 2/2004 | Chung | |
| 6,693,840 B2 | 2/2004 | Shimada et al. | |
| 6,700,491 B2 | 3/2004 | Shafer | |
| 6,706,449 B2 | 3/2004 | Mikhaylik et al. | |

| | | |
|---|---|---|
| 6,709,778 B2 | 3/2004 | Johnson |
| 6,713,216 B2 | 3/2004 | Kugai et al. |
| 6,713,389 B2 | 3/2004 | Speakman |
| 6,713,987 B2 | 3/2004 | Krasnov et al. |
| 6,723,140 B2 | 4/2004 | Chu et al. |
| 6,730,423 B2 | 5/2004 | Einhart et al. |
| 6,733,924 B1 | 5/2004 | Skotheim et al. |
| 6,737,197 B2 | 5/2004 | Chu et al. |
| 6,737,789 B2 | 5/2004 | Radziemski et al. |
| 6,741,178 B1 | 5/2004 | Tuttle |
| 6,750,156 B2 | 6/2004 | Le et al. |
| 6,752,842 B2 | 6/2004 | Luski et al. |
| 6,753,108 B1 | 6/2004 | Hampden-Smith et al. |
| 6,753,114 B2 | 6/2004 | Jacobs et al. |
| 6,760,520 B1 | 7/2004 | Medin et al. |
| 6,764,525 B1 | 7/2004 | Whitacre et al. |
| 6,768,246 B2 | 7/2004 | Pelrine et al. |
| 6,768,855 B1 | 7/2004 | Bakke et al. |
| 6,770,176 B2 | 8/2004 | Benson et al. |
| 6,773,848 B1 | 8/2004 | Nortoft et al. |
| 6,780,208 B2 | 8/2004 | Hopkins et al. |
| 6,797,428 B1 | 9/2004 | Skotheim et al. |
| 6,797,429 B1 | 9/2004 | Komastu |
| 6,805,998 B2 | 10/2004 | Jensen et al. |
| 6,805,999 B2 | 10/2004 | Lee et al. |
| 6,818,356 B1 | 11/2004 | Bates |
| 6,822,157 B2 | 11/2004 | Fujioka |
| 6,824,922 B2 | 11/2004 | Park et al. |
| 6,827,826 B2 | 12/2004 | Demaray et al. |
| 6,828,063 B2 | 12/2004 | Park et al. |
| 6,828,065 B2 | 12/2004 | Munshi |
| 6,830,846 B2 | 12/2004 | Kramlich et al. |
| 6,835,493 B2 | 12/2004 | Zhang et al. |
| 6,838,209 B2 | 1/2005 | Langan et al. |
| 6,846,765 B2 | 1/2005 | Imamura et al. |
| 6,852,139 B2 | 2/2005 | Zhang et al. |
| 6,855,441 B1 | 2/2005 | Levanon |
| 6,861,821 B2 | 3/2005 | Masumoto et al. |
| 6,863,699 B1 | 3/2005 | Krasnov et al. |
| 6,866,901 B2 | 3/2005 | Burrows et al. |
| 6,866,963 B2 | 3/2005 | Seung et al. |
| 6,869,722 B2 | 3/2005 | Kearl |
| 6,884,327 B2 | 4/2005 | Pan et al. |
| 6,886,240 B2 | 5/2005 | Zhang et al. |
| 6,890,385 B2 | 5/2005 | Tsuchiya et al. |
| 6,896,992 B2 | 5/2005 | Kearl |
| 6,899,975 B2 | 5/2005 | Watanabe et al. |
| 6,902,660 B2 | 6/2005 | Lee et al. |
| 6,905,578 B1 | 6/2005 | Moslehi et al. |
| 6,906,436 B2 | 6/2005 | Jenson et al. |
| 6,911,667 B2 | 6/2005 | Pichler et al. |
| 6,916,679 B2 | 7/2005 | Snyder et al. |
| 6,921,464 B2 | 7/2005 | Krasnov et al. |
| 6,923,702 B2 | 8/2005 | Graff et al. |
| 6,924,164 B2 | 8/2005 | Jensen |
| 6,929,879 B2 | 8/2005 | Yamazaki |
| 6,936,377 B2 | 8/2005 | Wensley et al. |
| 6,936,381 B2 | 8/2005 | Skotheim et al. |
| 6,936,407 B2 | 8/2005 | Pichler |
| 6,949,389 B2 | 9/2005 | Pichler et al. |
| 6,955,986 B2 | 10/2005 | Li |
| 6,962,613 B2 | 11/2005 | Jenson |
| 6,962,671 B2 | 11/2005 | Martin et al. |
| 6,964,829 B2 | 11/2005 | Utsugi et al. |
| 6,982,132 B1 | 1/2006 | Goldner et al. |
| 6,986,965 B2 | 1/2006 | Jenson et al. |
| 6,994,933 B1 | 2/2006 | Bates |
| 7,022,431 B2 | 4/2006 | Shchori et al. |
| 7,033,406 B2 | 4/2006 | Weir et al. |
| 7,045,246 B2 | 5/2006 | Simburger et al. |
| 7,045,372 B2 | 5/2006 | Ballantine et al. |
| 7,056,620 B2 | 6/2006 | Krasnov et al. |
| 7,073,723 B2 | 7/2006 | Fürst et al. |
| 7,095,372 B2 | 8/2006 | Soler Castany et al. |
| 7,129,166 B2 | 10/2006 | Speakman |
| 7,131,189 B2 | 11/2006 | Jenson |
| 7,144,654 B2 | 12/2006 | LaFollette et al. |
| 7,144,655 B2 | 12/2006 | Jenson et al. |
| 7,157,187 B2 | 1/2007 | Jenson |
| 7,158,031 B2 | 1/2007 | Tuttle |
| 7,162,392 B2 | 1/2007 | Vock et al. |
| 7,183,693 B2 | 2/2007 | Brantner et al. |
| 7,186,479 B2 | 3/2007 | Krasnov et al. |
| 7,194,801 B2 | 3/2007 | Jenson et al. |
| 7,198,832 B2 | 4/2007 | Burrows et al. |
| 7,202,825 B2 | 4/2007 | Leizerovich et al. |
| 7,220,517 B2 | 5/2007 | Park et al. |
| 7,230,321 B2 | 6/2007 | McCain |
| 7,247,408 B2 | 7/2007 | Skotheim et al. |
| 7,253,494 B2 | 8/2007 | Mino et al. |
| 7,265,674 B2 | 9/2007 | Tuttle |
| 7,267,904 B2 | 9/2007 | Komatsu et al. |
| 7,267,906 B2 | 9/2007 | Mizuta et al. |
| 7,273,682 B2 | 9/2007 | Park et al. |
| 7,274,118 B2 | 9/2007 | Jenson et al. |
| 7,288,340 B2 | 10/2007 | Iwamoto |
| 7,316,867 B2 | 1/2008 | Park et al. |
| 7,323,634 B2 | 1/2008 | Speakman |
| 7,332,363 B2 | 2/2008 | Edwards |
| 7,335,441 B2 | 2/2008 | Luski et al. |
| RE40,137 E | 3/2008 | Tuttle et al. |
| 7,345,647 B1 | 3/2008 | Rodenbeck |
| 7,348,099 B2 | 3/2008 | Mukai et al. |
| 7,389,580 B2 | 6/2008 | Jenson et al. |
| 7,400,253 B2 | 7/2008 | Cohen |
| 7,410,730 B2 | 8/2008 | Bates |
| RE40,531 E | 10/2008 | Graff et al. |
| 7,466,274 B2 * | 12/2008 | Lin et al. ............... 343/702 |
| 7,468,221 B2 | 12/2008 | LaFollette et al. |
| 7,494,742 B2 | 2/2009 | Tarnowski et al. |
| 7,670,724 B1 | 3/2010 | Chan et al. |
| 7,848,715 B2 * | 12/2010 | Boos ..................... 455/91 |
| 7,858,223 B2 | 12/2010 | Visco et al. |
| 8,010,048 B2 * | 8/2011 | Brommer et al. ........... 455/41.2 |
| 8,056,814 B2 * | 11/2011 | Martin et al. ............ 235/487 |
| 2001/0005561 A1 | 6/2001 | Yamada et al. |
| 2001/0027159 A1 | 10/2001 | Kaneyoshi |
| 2001/0031122 A1 | 10/2001 | Lackritz et al. |
| 2001/0032666 A1 | 10/2001 | Jenson et al. |
| 2001/0033952 A1 | 10/2001 | Jenson et al. |
| 2001/0034106 A1 | 10/2001 | Moise et al. |
| 2001/0041294 A1 | 11/2001 | Chu et al. |
| 2001/0041460 A1 | 11/2001 | Wiggins |
| 2001/0052752 A1 | 12/2001 | Ghosh et al. |
| 2001/0054437 A1 | 12/2001 | Komori et al. |
| 2001/0055719 A1 | 12/2001 | Akashi et al. |
| 2002/0000034 A1 | 1/2002 | Jenson |
| 2002/0001746 A1 | 1/2002 | Jenson |
| 2002/0001747 A1 | 1/2002 | Jenson |
| 2002/0004167 A1 | 1/2002 | Jenson et al. |
| 2002/0009630 A1 | 1/2002 | Gao et al. |
| 2002/0019296 A1 | 2/2002 | Freeman et al. |
| 2002/0028377 A1 | 3/2002 | Gross |
| 2002/0033330 A1 | 3/2002 | Demaray et al. |
| 2002/0037756 A1 | 3/2002 | Jacobs et al. |
| 2002/0066539 A1 | 6/2002 | Muller |
| 2002/0067615 A1 | 6/2002 | Muller |
| 2002/0071989 A1 | 6/2002 | Verma et al. |
| 2002/0076133 A1 | 6/2002 | Li et al. |
| 2002/0091929 A1 | 7/2002 | Ehrensvard |
| 2002/0093029 A1 | 7/2002 | Ballantine et al. |
| 2002/0106297 A1 | 8/2002 | Ueno et al. |
| 2002/0110733 A1 | 8/2002 | Johnson |
| 2002/0115252 A1 | 8/2002 | Haukka et al. |
| 2002/0134671 A1 | 9/2002 | Demaray et al. |
| 2002/0139662 A1 | 10/2002 | Lee |
| 2002/0140103 A1 | 10/2002 | Kloster et al. |
| 2002/0159245 A1 | 10/2002 | Murasko et al. |
| 2002/0161404 A1 | 10/2002 | Schmidt |
| 2002/0164441 A1 | 11/2002 | Amine et al. |
| 2002/0170821 A1 | 11/2002 | Sandlin et al. |
| 2002/0170960 A1 | 11/2002 | Ehrensvard et al. |
| 2003/0019326 A1 | 1/2003 | Han et al. |
| 2003/0022487 A1 | 1/2003 | Yoon et al. |
| 2003/0024994 A1 | 2/2003 | Ladyansky |
| 2003/0029493 A1 | 2/2003 | Plessing |
| 2003/0030589 A1 * | 2/2003 | Zurcher et al. ............ 343/718 |
| 2003/0035906 A1 | 2/2003 | Memarian et al. |

| | | |
|---|---|---|
| 2003/0036003 A1 | 2/2003 | Shchori et al. |
| 2003/0042131 A1 | 3/2003 | Johnson |
| 2003/0044665 A1 | 3/2003 | Rastegar et al. |
| 2003/0048635 A1 | 3/2003 | Knoerzer et al. |
| 2003/0063883 A1 | 4/2003 | Demaray et al. |
| 2003/0064292 A1 | 4/2003 | Neudecker et al. |
| 2003/0068559 A1 | 4/2003 | Armstrong et al. |
| 2003/0076642 A1 | 4/2003 | Shiner et al. |
| 2003/0077914 A1 | 4/2003 | Le et al. |
| 2003/0079838 A1 | 5/2003 | Brcka |
| 2003/0091904 A1 | 5/2003 | Munshi |
| 2003/0095463 A1 | 5/2003 | Shimada et al. |
| 2003/0097858 A1 | 5/2003 | Strohhofer et al. |
| 2003/0109903 A1 | 6/2003 | Berrang et al. |
| 2003/0127319 A1 | 7/2003 | Demaray et al. |
| 2003/0134054 A1 | 7/2003 | Demaray et al. |
| 2003/0141186 A1 | 7/2003 | Wang et al. |
| 2003/0143853 A1 | 7/2003 | Celii et al. |
| 2003/0146877 A1 | 8/2003 | Mueller |
| 2003/0152829 A1 | 8/2003 | Zhang et al. |
| 2003/0162094 A1 | 8/2003 | Lee et al. |
| 2003/0173207 A1 | 9/2003 | Zhang et al. |
| 2003/0173208 A1 | 9/2003 | Pan et al. |
| 2003/0174391 A1 | 9/2003 | Pan et al. |
| 2003/0175142 A1 | 9/2003 | Milonopoulou et al. |
| 2003/0178623 A1 | 9/2003 | Nishiki et al. |
| 2003/0178637 A1 | 9/2003 | Chen et al. |
| 2003/0180610 A1 | 9/2003 | Felde et al. |
| 2003/0185266 A1 | 10/2003 | Henrichs |
| 2003/0231106 A1 | 12/2003 | Shafer |
| 2003/0232248 A1 | 12/2003 | Iwamoto et al. |
| 2004/0008587 A1 | 1/2004 | Siebott et al. |
| 2004/0015735 A1 | 1/2004 | Norman |
| 2004/0023106 A1 | 2/2004 | Benson et al. |
| 2004/0028875 A1 | 2/2004 | Van Rijn et al. |
| 2004/0029311 A1 | 2/2004 | Snyder et al. |
| 2004/0038050 A1 | 2/2004 | Saijo et al. |
| 2004/0043557 A1 | 3/2004 | Haukka et al. |
| 2004/0048157 A1 | 3/2004 | Neudecker et al. |
| 2004/0058237 A1 | 3/2004 | Higuchi et al. |
| 2004/0072067 A1 | 4/2004 | Minami et al. |
| 2004/0077161 A1 | 4/2004 | Chen et al. |
| 2004/0078662 A1 | 4/2004 | Hamel et al. |
| 2004/0081415 A1 | 4/2004 | Demaray et al. |
| 2004/0081860 A1 | 4/2004 | Hundt et al. |
| 2004/0085002 A1 | 5/2004 | Pearce |
| 2004/0101761 A1 | 5/2004 | Park et al. |
| 2004/0105644 A1 | 6/2004 | Dawes |
| 2004/0106038 A1 | 6/2004 | Shimamura et al. |
| 2004/0106045 A1 | 6/2004 | Ugaji |
| 2004/0106046 A1 | 6/2004 | Inda |
| 2004/0118700 A1 | 6/2004 | Schierle-Arndt et al. |
| 2004/0126305 A1 | 7/2004 | Chen et al. |
| 2004/0151986 A1 | 8/2004 | Park et al. |
| 2004/0161640 A1 | 8/2004 | Salot |
| 2004/0175624 A1 | 9/2004 | Luski et al. |
| 2004/0188239 A1 | 9/2004 | Robison et al. |
| 2004/0209159 A1 | 10/2004 | Lee et al. |
| 2004/0212276 A1 | 10/2004 | Brantner et al. |
| 2004/0214079 A1 | 10/2004 | Simburger et al. |
| 2004/0219434 A1 | 11/2004 | Benson et al. |
| 2004/0245561 A1 | 12/2004 | Sakashita et al. |
| 2004/0258984 A1 | 12/2004 | Ariel et al. |
| 2004/0259305 A1 | 12/2004 | Demaray et al. |
| 2005/0000794 A1 | 1/2005 | Demaray et al. |
| 2005/0006768 A1 | 1/2005 | Narasimhan et al. |
| 2005/0048802 A1 | 3/2005 | Zhang et al. |
| 2005/0070097 A1 | 3/2005 | Barmak et al. |
| 2005/0072458 A1 | 4/2005 | Goldstein |
| 2005/0079418 A1 | 4/2005 | Kelley et al. |
| 2005/0095506 A1 | 5/2005 | Klaassen |
| 2005/0105231 A1 | 5/2005 | Hamel et al. |
| 2005/0110457 A1 | 5/2005 | LaFollette et al. |
| 2005/0112461 A1 | 5/2005 | Amine et al. |
| 2005/0118464 A1 | 6/2005 | Levanon |
| 2005/0130032 A1 | 6/2005 | Krasnov et al. |
| 2005/0133361 A1 | 6/2005 | Ding et al. |
| 2005/0141170 A1 | 6/2005 | Honda et al. |
| 2005/0142447 A1 | 6/2005 | Nakai et al. |
| 2005/0147877 A1 | 7/2005 | Tarnowski et al. |
| 2005/0158622 A1 | 7/2005 | Mizuta et al. |
| 2005/0170736 A1 | 8/2005 | Cok |
| 2005/0175891 A1 | 8/2005 | Kameyama et al. |
| 2005/0176181 A1 | 8/2005 | Burrows et al. |
| 2005/0181280 A1 | 8/2005 | Ceder et al. |
| 2005/0183946 A1 | 8/2005 | Pan et al. |
| 2005/0189139 A1 | 9/2005 | Stole |
| 2005/0208371 A1 | 9/2005 | Kim et al. |
| 2005/0239917 A1 | 10/2005 | Nelson et al. |
| 2005/0255828 A1 | 11/2005 | Fisher |
| 2005/0266161 A1 | 12/2005 | Medeiros et al. |
| 2006/0019504 A1 | 1/2006 | Taussig |
| 2006/0021214 A1 | 2/2006 | Jenson et al. |
| 2006/0021261 A1 | 2/2006 | Face |
| 2006/0040177 A1 | 2/2006 | Onodera et al. |
| 2006/0046907 A1 | 3/2006 | Rastegar et al. |
| 2006/0054496 A1 | 3/2006 | Zhang et al. |
| 2006/0057283 A1 | 3/2006 | Zhang et al. |
| 2006/0057304 A1 | 3/2006 | Zhang et al. |
| 2006/0063074 A1 | 3/2006 | Jenson et al. |
| 2006/0071592 A1 | 4/2006 | Narasimhan et al. |
| 2006/0155545 A1 | 7/2006 | Janye |
| 2006/0201583 A1 | 9/2006 | Michaluk et al. |
| 2006/0210779 A1 | 9/2006 | Weir et al. |
| 2006/0222954 A1 | 10/2006 | Skotheim et al. |
| 2006/0234130 A1 | 10/2006 | Inda |
| 2006/0237543 A1 | 10/2006 | Goto et al. |
| 2006/0255435 A1 | 11/2006 | Fuergut et al. |
| 2006/0286448 A1 | 12/2006 | Snyder et al. |
| 2007/0009802 A1 | 1/2007 | Lee et al. |
| 2007/0021156 A1 | 1/2007 | Hoong et al. |
| 2007/0023275 A1 | 2/2007 | Tanase et al. |
| 2007/0037058 A1 | 2/2007 | Visco et al. |
| 2007/0053139 A1 | 3/2007 | Zhang et al. |
| 2007/0087230 A1 | 4/2007 | Jenson et al. |
| 2007/0091543 A1 | 4/2007 | Gasse et al. |
| 2007/0125638 A1 | 6/2007 | Zhang et al. |
| 2007/0141468 A1 | 6/2007 | Barker |
| 2007/0148065 A1 | 6/2007 | Weir et al. |
| 2007/0148553 A1 | 6/2007 | Weppner |
| 2007/0151661 A1 | 7/2007 | Mao et al. |
| 2007/0164376 A1 | 7/2007 | Burrows et al. |
| 2007/0166612 A1 | 7/2007 | Krasnov et al. |
| 2007/0184345 A1 | 8/2007 | Neudecker et al. |
| 2007/0196682 A1 | 8/2007 | Visser et al. |
| 2007/0202395 A1 | 8/2007 | Snyder et al. |
| 2007/0205513 A1 | 9/2007 | Brunnbauer et al. |
| 2007/0210459 A1 | 9/2007 | Burrows et al. |
| 2007/0222681 A1 | 9/2007 | Greene et al. |
| 2007/0224951 A1 | 9/2007 | Gilb et al. |
| 2007/0229228 A1* | 10/2007 | Yamazaki et al. .......... 340/10.34 |
| 2007/0235320 A1 | 10/2007 | White et al. |
| 2007/0264564 A1 | 11/2007 | Johnson et al. |
| 2007/0278653 A1 | 12/2007 | Brunnbauer et al. |
| 2007/0298326 A1 | 12/2007 | Angell et al. |
| 2008/0003496 A1 | 1/2008 | Neudecker et al. |
| 2008/0008936 A1 | 1/2008 | Mizuta et al. |
| 2008/0014501 A1 | 1/2008 | Skotheim et al. |
| 2008/0057397 A1 | 3/2008 | Skotheim et al. |
| 2008/0150829 A1* | 6/2008 | Lin et al. ....................... 343/860 |
| 2008/0213672 A1 | 9/2008 | Skotheim et al. |
| 2008/0233708 A1 | 9/2008 | Hisamatsu |
| 2008/0254575 A1 | 10/2008 | Fuergut et al. |
| 2008/0261107 A1 | 10/2008 | Snyder et al. |
| 2008/0263855 A1 | 10/2008 | Li et al. |
| 2008/0286651 A1 | 11/2008 | Neudecker et al. |
| 2009/0092903 A1 | 4/2009 | Johnson et al. |
| 2009/0124201 A1* | 5/2009 | Meskens ...................... 455/41.2 |
| 2009/0181303 A1 | 7/2009 | Neudecker et al. |
| 2009/0302226 A1 | 12/2009 | Schieber et al. |
| 2009/0308936 A1* | 12/2009 | Nitzan et al. .................. 235/492 |
| 2009/0312069 A1* | 12/2009 | Peng et al. .................... 455/572 |
| 2010/0001079 A1* | 1/2010 | Martin et al. ................. 235/492 |
| 2010/0032001 A1 | 2/2010 | Brantner |
| 2010/0086853 A1 | 4/2010 | Venkatachalam et al. |
| 2011/0267235 A1* | 11/2011 | Brommer et al. ............. 342/457 |
| 2011/0304430 A1* | 12/2011 | Brommer et al. ............. 340/8.1 |

FOREIGN PATENT DOCUMENTS

| | | |
|---|---|---|
| CN | 1532984 | 9/2004 |
| DE | 19824145 | 12/1999 |
| DE | 10 2005 014 427 | 9/2006 |
| DE | 10 2006 054 309 | 11/2006 |
| DE | 10 2008 016 665 | 10/2008 |
| DE | 10 2007 030604 | 1/2009 |
| EP | 0 510 883 | 10/1992 |
| EP | 0 639 655 | 2/1995 |
| EP | 0 652 308 | 5/1995 |
| EP | 0 820 088 | 1/1998 |
| EP | 1 068 899 | 1/2001 |
| EP | 0 867 985 | 2/2001 |
| EP | 1 092 689 | 4/2001 |
| EP | 1 189 080 | 3/2002 |
| EP | 1 713 024 | 10/2006 |
| FR | 2806198 | 9/2001 |
| FR | 2 861 218 | 4/2005 |
| JP | 55-009305 | 1/1980 |
| JP | 56-076060 | 6/1981 |
| JP | 56-156675 | 12/1981 |
| JP | 60-068558 | 4/1985 |
| JP | 61-269072 | 11/1986 |
| JP | 62-267944 | 11/1987 |
| JP | 63-290922 | 11/1988 |
| JP | 2000-162234 | 11/1988 |
| JP | 2-054764 | 2/1990 |
| JP | 2-230662 | 9/1990 |
| JP | 03-036962 | 2/1991 |
| JP | 4-058456 | 2/1992 |
| JP | 4-072049 | 3/1992 |
| JP | 6-010127 | 1/1994 |
| JP | 6-100333 | 4/1994 |
| JP | 7-233469 | 5/1995 |
| JP | 7-224379 | 8/1995 |
| JP | 08-114408 | 5/1996 |
| JP | 10-026571 | 1/1998 |
| JP | 10-239187 | 9/1998 |
| JP | 11-204088 | 7/1999 |
| JP | 2000-144435 | 5/2000 |
| JP | 2000-188099 | 7/2000 |
| JP | 2000-268867 | 9/2000 |
| JP | 2001-171812 | 6/2001 |
| JP | 2001-259494 | 9/2001 |
| JP | 2001-297764 | 10/2001 |
| JP | 2001-328198 | 11/2001 |
| JP | 2002-140776 | 5/2002 |
| JP | 2002-344115 | 11/2002 |
| JP | 2003-17040 | 1/2003 |
| JP | 2003-347045 | 12/2003 |
| JP | 2004-071305 | 3/2004 |
| JP | 2004-149849 | 5/2004 |
| JP | 2004-158268 | 6/2004 |
| JP | 2004-273436 | 9/2004 |
| JP | 2005-256101 | 9/2005 |
| JP | 2002-026412 | 2/2007 |
| JP | 7-107752 | 4/2007 |
| KR | 20020007881 | 1/2002 |
| KR | 20020017790 | 3/2002 |
| KR | 20020029813 | 4/2002 |
| KR | 20020038917 | 5/2002 |
| KR | 20030033913 | 5/2003 |
| KR | 20030042288 | 5/2003 |
| KR | 20030085252 | 11/2003 |
| RU | 2241281 | 11/2004 |
| WO | WO 9513629 | 5/1995 |
| WO | WO 9623085 | 8/1996 |
| WO | WO 9623217 | 8/1996 |
| WO | WO 9727344 | 7/1997 |
| WO | WO 9735044 | 9/1997 |
| WO | WO 9847196 | 10/1998 |
| WO | WO 9943034 | 8/1999 |
| WO | WO 9957770 | 11/1999 |
| WO | WO 0021898 | 4/2000 |
| WO | WO 0022742 | 4/2000 |
| WO | WO 0028607 | 5/2000 |
| WO | WO 0036665 | 6/2000 |
| WO | WO 0060682 | 10/2000 |
| WO | WO 0060689 | 10/2000 |
| WO | WO 0062365 | 10/2000 |
| WO | WO 0101507 | 1/2001 |
| WO | WO 0117052 | 3/2001 |
| WO | WO 0124303 | 4/2001 |
| WO | WO 0133651 | 5/2001 |
| WO | WO 0139305 | 5/2001 |
| WO | WO 0173864 | 10/2001 |
| WO | WO 0173865 | 10/2001 |
| WO | WO 0173866 | 10/2001 |
| WO | WO 0173868 | 10/2001 |
| WO | WO 0173870 | 10/2001 |
| WO | WO 0173883 | 10/2001 |
| WO | WO 0173957 | 10/2001 |
| WO | WO 0182390 | 11/2001 |
| WO | WO 0212932 | 2/2002 |
| WO | WO 0242516 | 5/2002 |
| WO | WO 0247187 | 6/2002 |
| WO | WO 02071506 | 9/2002 |
| WO | WO 02101857 | 12/2002 |
| WO | WO 03003485 | 1/2003 |
| WO | WO 03005477 | 1/2003 |
| WO | WO 03026039 | 3/2003 |
| WO | WO 03036670 | 5/2003 |
| WO | WO 03069714 | 8/2003 |
| WO | WO 03080325 | 10/2003 |
| WO | WO 03083166 | 10/2003 |
| WO | WO 2004012283 | 2/2004 |
| WO | WO 2004021532 | 3/2004 |
| WO | WO 2004061887 | 7/2004 |
| WO | WO 2004077519 | 9/2004 |
| WO | WO 2004086550 | 10/2004 |
| WO | WO 2004093223 | 10/2004 |
| WO | WO 2004106581 | 12/2004 |
| WO | WO 2004106582 | 12/2004 |
| WO | WO 2005008828 | 1/2005 |
| WO | WO 2005013394 | 2/2005 |
| WO | WO 2005038957 | 4/2005 |
| WO | WO 2005067645 | 7/2005 |
| WO | WO 2005085138 | 9/2005 |
| WO | WO 2005091405 | 9/2005 |
| WO | WO 2006063308 | 6/2006 |
| WO | WO 2006085307 | 8/2006 |
| WO | WO 2007016781 | 2/2007 |
| WO | WO 2007019855 | 2/2007 |
| WO | WO 2007027535 | 3/2007 |
| WO | WO 2007095604 | 8/2007 |
| WO | WO 2008036731 | 3/2008 |

OTHER PUBLICATIONS

Hwang et al., "Characterization of Sputter-Deposited $LiMn_2O_4$ Thin Films for Rechargeable Microbatteries," 141(12) J. Electrochem. Soc. 3296-99 (1994).

Jones et al., 53-56 Solid State Ionics 628 (1992).

Mattox "Handbook of Physical Vapor Deposition (PVD) Processing, Society of Vacuum Coaters," Albuquerque, New Mexico 660f and 692ff, Noyes Publications (1998).

Hill, R. et al., "Large Area Deposition by Mid-Frequency AC Sputtering," Society of Vacuum Coaters, $41^{st}$ Annual Tech. Conference Proceedings, 197-202 (1998).

Macák, Karol et al, "Ionized Sputter Deposition Using an Extremely High Plasma Density Pulsed Magnetron Discharge," J. Vac. Sci. Technol. A 18(4):1533-37 (2000).

Balanis, Constantine A., "Antenna Theory: Analysis and Design," 3rd Ed., pp. 817-820 (John Wiley & Sons, Inc. Publication, 2005).

Affinito, J.D. et al., "PML/oxide/PML barrier layer performance differences arising from use of UV or electron beam polymerization of the PML layers," Thin Solid Films 308-309: 19-25 (1997).

Affinito, J.D. et al., "Polymer-oxide transparent barrier layers," Society of Vacuum Coaters, $39^{th}$ Ann. Technical Conference Proceedings, May 5-10, 1996, Philadelphia, PA, pp. 392-397 (1996).

Alder, T. et al., "High-efficiency fiber-to-chip coupling using low-loss tapered single-mode fiber," IEEE Photonics Tech. Lett. 12(8): 1016-1018 (2000).

Almeida, V.R. et al., "Nanotaper for compact mode conversion," Optics Letters 28(15): 1302-1304 (2003).

Anh et al., "Significant Suppression of Leakage Current in (Ba,Sr)TiO$_3$ Thin Films by Ni or Mn Doping," J. Appl. Phys.,92(5): 2651-2654 (Sep. 2002).

Asghari, M. and Dawnay, E., "ASOC™—a manufacturing integrated optics technology," SPIE 3620: 252-262 (Jan. 1999).

Barbier, D. et al., "Amplifying four-wavelength combiner, based on erbium/ytterbium-doped waveguide amplifiers and integrated splitters," IEEE Photonics Tech. Lett. 9:315-317 (1997).

Barbier, D., "Performances and potential applications of erbium doped planar waveguide amplifiers and lasers," Proc. OAA, Victoria, BC, Canada, pp. 58-63 (Jul. 21-23, 1997).

Bates et al., "Thin-Film Lithium Batteries" in New Trends in Electrochemical Technology: Energy Storage Systems for Electronics (T. Osaka & M. Datta eds. Gordon and Breach 2000).

Beach R.J., "Theory and optimization of lens ducts," Applied Optics 35(12): 2005-2015 (1996).

Belkind, A. et al., "Pulsed-DC Reactive Sputtering of Dielectrics: Pulsing Parameter Effects," 43$^{rd}$ Annual Technical Conference Proceedings (2000).

Belkind, A. et al., "Using pulsed direct current power for reactive sputtering of Al$_2$O$_3$," J. Vac. Sci. Technol. A 17(4): 1934-1940 (1999).

Bestwick, T., "ASOC™ silicon integrated optics technology," SPIE 3631: 182-190 (1999).

Borsella, E. et al., "Structural incorporation of silver in soda-lime glass by the ion-exchange process: a photoluminescence spectroscopy study," Applied Physics A 71: 125-132 (2000).

Byer, R.L., "Nonlinear optics and solid-state lasers: 2000," IEEE J. Selected Topics in Quantum Electronics 6(6): 911-930 (2000).

Campbell, S.A. et al., "Titanium dioxide (TiO2)-based gate insulators," IBM J. Res. Develop. 43(3): 383-392 (1999).

Chang, C.Y. and Sze, S.M. (eds.), in ULSI Technology, The McGraw-Hill Companies, Inc., Nyew York, Chapter 4, pp. 169-170 and 226-231 (1996).

Chen, G. et al., "Development of supported bifunctional electrocatalysts for unitized regenerative fuel cells," J. Electrochemical Society 149(8): A1092-A1099 (2002).

Choi, Y.B. et al., "Er—Al-codoped silicate planar light waveguide-type amplifier fabricated by radio-frequency sputtering," Optics Letters 25(4): 263-265 (2000).

Choy et al., "Eu-Doped Y2O3 Phosphor Films Produced by Electrostatic-Assisted Chemical Vapor Deposition," J. Mater. Res. 14(7): 3111-3114 (Jul. 1999).

Cocorullo, G. et al., "Amorphous silicon waveguides and light modulators for integrated photonics realized by low-temperature plasma-enhanced chemical-vapor deposition," Optics Lett. 21(24): 2002-2004 (1996).

Cooksey, K. et al., "Predicting permeability & Transmission rate for multilayer materials," Food Technology 53(9): 60-63 (1999).

Crowder, M.A. et al., "Low-temperature single-crystal Si TFT's fabricated on Si films processed via sequential lateral solidification," IEEE Electron Device Lett. 19(8): 306-308 (1998).

Delavaux, J-M. et al., "Integrated optics erbium ytterbium amplifier system in 10Gb/s fiber transmission experiment," 22$^{nd}$ European Conference on Optical Communication, Osla, 1.123-1.126 (1996).

Distributed Energy Resources: Fuel Cells, Projects, 4 pages http://www.eere.energy.gov/der/fuel_cells/projects.html (2003).

Dorey, R.A., "Low temperature micromoulding of functional ceramic devices," Grant summary for GR/S84156/01 for the UK Engineering and Physical Sciences Research Council, 2 pages (2004).

DuPont Teijin Films, Mylar 200 SBL 300, Product Information, 4 pages (2000).

Electrometals Technologies Limited, Financial Report for 2002, Corporate Directory, Chairman's review, Review of Operations, 10 pages (2002).

E-Tek website: FAQ, Inside E-Tek, E-TEk News, Products; http://www.etek-inc.com/, 10 pages (2003).

Flytzanis, C. et al., "Nonlinear optics in composite materials," in Progress in Optics XXIX, Elsevier Science Publishers B.V., pp. 323-425 (1991).

Frazao, O. et al., "EDFA gain flattening using long-period fibre gratings based on the electric arc technique," Proc. London Comm. Symp. 2001, London, England, 3 pages (2001).

Fujii, M. et al., "1.54 µm photoluminescence of Er$^{3+}$ doped into SiO$_2$ films containing Si nanocrystals: evidence for energy transfer from Si nanocrystals for Er$^{3+}$," Appl. Phys. Lett. 71(9): 1198-1200 (1997).

Garcia, C. et al., "Size dependence of lifetime and absorption cross section of Si nanocrystals embedded in SiO$_2$," Appl. Phys. Lett. 82(10): 1595-1597 (2003).

Goossens, A. et al., "Sensitization of TiO$_2$ with p-type semiconductor polymers," Chem. Phys. Lett. 287: 148 (1998).

Greene, J.E. et al., "Morphological and electrical properties of rf sputtered Y$_2$O$_3$-doped ZrO$_2$ thin films," J. Vac. Sci. Tech. 13(1): 72-75 (1976).

Han, H.-S. et al., "Optical gain at 1.54 µm in Erbium-doped Silicon nanocluster sensitized waveguide," Appl. Phys. Lett. 79(27): 4568-4570 (2001).

Hayakawa, T. et al., "Enhanced fluorescence from Eu$^{3+}$ owing to surface plasma oscillation of silver particles in glass," J. Non-Crystalline Solids 259: 16-22 (1999).

Hayakawa, T. et al., "Field enhancement effect of small Ag particles on the fluorescence from Eu$^{3+}$-doped SiO$_2$ glass," Appl. Phys. Lett. 74(11): 1513-1515 (1999).

Hayfield, P.C.S., I Development of a New Material-Monolithic Ti$_4$O$_7$ Ebonix® Ceramic, Royal Society of Chemistry, Cambridge, Table of Contents, 4 pages (2002).

Hehlen, M.P. et al., "Spectroscopic properties of Er$^{3+}$- and Yb$^{3+}$-doped soda-lime silicate and aluminosilicate glasses," Physical Review B 56(15): 9302-9318 (1997).

Hehlen, M.P. et al., "Uniform upconversion in high-concentration Er$^{3+}$-doped soda lime silicate and aluminosilicate glasses," Optics Letters 22(11); 772-774 (1997).

Horst, F. et al., "Compact, tunable optical devices in silicon-oxynitride waveguide technology," Top. Meeting Integrated Photonics Res. '00, Quebec, Canada, p. IThF1, 3 pages (2000).

Howson, R.P., "The reactive sputtering of oxides and nitrides," Pure & Appl. Chem. 66(6): 1311-1318 (1994).

Hubner, J. and Guldberg-Kjaer, S., "Planar Er- and Yb-doped amplifiers and lasers," COM Technical University of Denmark, 10$^{th}$ European Conf. on Integrated Optics, Session WeB2, pp. 71-74 (2001).

Hwang et al., "Characterization of sputter-deposited LiMn2O4 thin films for rechargeable microbatteries," 141(12) J. Electrochem. Soc. 3296-99 (1994).

Hwang, M-S. et al., "The effect of pulsed magnetron sputtering on the properties of iridium tin oxide thin films," Surface and Coatings Tech. 171: 29-33 (2003).

Im, J.S. and Sposili, R.S., "Crystalline Si films for integrated active-matrix liquid crystal displays," MRS Bulletin, pp. 39-48 (1996).

Im, J.S. et al., "Controlled super-lateral growth of Si-films for microstructural manipulation and optimization," Physica Status Solidi (A) 166(2): 603-617 (1998).

Im, J.S. et al., "Single-crystal Si films for thin-film transistor devices," Appl. Physics Lett. 70(25): 3434-3436 (1997).

Itoh, M. et al., "Large reduction of singlemode-fibre coupling loss in 1.5% Δ planar lightwave circuits using spot-size converters," Electronics Letters 38(2): 72-74 (2002).

Jackson, M.K. and Movassaghi, M., "An accurate compact EFA model," Eur. Conf. Optical Comm., Munich, Germany, 2 pages (2000).

Janssen, R. et al., "Photoinduced electron transfer from conjugated polymers onto nanocrystalline TiO$_2$," Synthet. Metal., 1 page (1999).

Johnson, J.E. et al., "Monolithically integrated semiconductor optical amplifier and electroabsorption modulator with dual-waveguide spot-size converter input," IEEE J. Selected topics in Quantum Electronics 6(1): 19-25 (2000).

Jonsson, L.B. et al., "Frequency response in pulsed DC reactive sputtering processes," Thin Solid Films 365: 43-48 (2000).

Kato, K. and Inoue, Y., "Recent progress on PLC hybrid integration," SPIE 3631: 28-36 (1999).

Kato, K. and Tohmori, Y., "PLC hybrid integration technology and its application to photonic components," IEEE J. Selected Topics in Quantum Electronics 6(1): 4-13 (2000).

Kelly, P.J. and Arnell, R.D., "Control of the structure and properties of aluminum oxide coatings deposited by pulsed magnetron sputtering," J. Vac. Sci. Technol. A 17(3): 945-953 (1999).

Kelly, P.J. et al., "A novel technique for the deposition of aluminum-doped zinc oxide films," Thin Solid Films 426(1-2): 111-116 (2003).

Kelly, P.J. et al., "Reactive pulsed magnetron sputtering process for alumina films," J. Vac. Sci. Technol. A 18(6): 2890-2896 (2000).

Kik, P.G. and Polman, A., "Gain limiting processes in Er-doped Si nanocrystal waveguides in $SiO_2$," J. Appl. Phys. 91(1): 536-536 (2002).

Kim et al., "Correlation Between the Microstructures and the Cycling Performance of $RuO_2$ Electrodes for Thin-Film Microsupercapacitros," J. Vac. Sci. Technol. B20(5): 1827-1832 (Sep. 2002).

Kim, D-W. et al. "Mixture Behavior and Microwave Dielectric Properties in the Low-fired $TiO_2$-CuO System," Jpn. J. Appl. Phys. 39:2696-2700 (2000).

Kim, H-K. et al., "Characteristics of rapid-thermal-annealed LiCoO2 cathode film for an all-solid-state thin film microbattery," J. Vac. Sci. Technol. A 22(4): 1182-1187 (2004).

Kim, J-Y. et al. "Frequency-dependent pulsed direct current magnetron sputtering of titanium oxide films," J. Vac. Sci. Technol. A 19(2):429-434 (2001).

Ladouceur, F. and Love, J.D., in: Silica-based Buried Channel Waveguides and Devices, Chapman & Hall, London, Table of Contents, 6 pages (1996).

Ladouceur, F. et al., "Effect of side wall roughness in buried channel waveguides," IEEE Proc. Optoelectron. 141(4):242-248 (1994).

Lamb, W. and Zeiler, R., Designing Non-Foil Containing Skins for Vacuum Insulation Panel (VIP) Application, Vuoto XXVIII(1-2):55-58 (1999).

Lamb, W.B., "Designing Nonfoil Containing Skins for VIP Applications," DuPont VIA Symposium Presentation, 35 Pages (1999).

Lange, M.R. et al, "High Gain Ultra-Short Length Phosphate glass Erbium-Doped Fiber Amplifier Material," OSA Optical Fiber Communications (OFC), 3 Pages (2002).

Laporta, P. et al, "Diode-pumped cw bulk Er: Yb: glass laser," Optics Letters 16(24):1952-1954 (1991).

Laurent-Lund, C. et al., "PECVD Grown Multiple Core Planar Waveguides with Extremely Low Interface Reflections and Losses," IEEE Photonics Tech. Lett. 10(10):1431-1433 (1998).

Lee, B.H. et al., "Effects of interfacial layer growth on the electrical characteristics of thin titanium oxide films on silion," Appl. Phys. Lett. 74(21):3143-3145 (1999).

Lee, K.K. et al., "Effect of size and roughness on light transmission in a $Si/SiO_2$ waveguide: Experiments and model," Appl. Phys. Lett. 77(11):1617-1619 (2000).

Love, J.D. et al., "Quantifying Loss Minimisation in Single-Mode Fibre Tapers," Electronics Letters 22(17):912-914 (1986).

Mardare, D. and Rusu, G.I., "On the structure of Titanium Oxide Thin Films," Andalele Stiintifice Ale Universitatii IASI, Romania, pp. 201-208 (1999).

Marques, P.V.S. et al., "Planar Silica-on-Silicon Waveguide Lasers Based in Two Layers Core Devices," $10^{th}$ European Conference on Integrated Optics, Session WeB2, pp. 79-82 (2001).

Meijerink, A. et al, "Luminescence of $Ag^+$ in Crystalline and Glassy $Srb_4O_7$," J. Physics Chem. Solids 54(8):901-906 (1993).

Mesnaoui, M. et al, "Spectroscopic properties of $Ag^+$ ions in phosphate glasses of $NaPO_3$-$AgPO_3$ system," Eur. J. Solid State Inorg. Chem. 29:1001-1013 (1992).

Mitomi, O. et al., "Design of a Single-Mode Tapered Waveguide for Low-Loss Chip-to-Fiber Coupling," IEEE J. Quantum Electronics 30(8): 1787-1793 (1994).

Mizuno, Y. et al "Temperature dependence of oxide decomposition on titanium surfaces in UHV," J. Vac. Sci & Tech. A. 20(5): 1716-1721 (2002).

Ohkubo, H. et al., Polarization-Insensitive Arrayed-Waveguide Grating Using Pure $SiO_2$ Cladding, Fifth Optoelectronics and Communication Conference (OECC 2000) Technical Digest, pp. 366-367 (2000).

Ohmi, S. et al., "Rare earth mental oxides for high-K fate insulator," VLSI Design 2004, 1 Page (2004).

Ohtsuki, T., et al., "Gain Characteristics of high concentration $Er^{3+}$-doped phosphate glass waveguide," J. Appl. Phys. 78(6):3617-3621 (1995).

Ono, H. et al., "Design of a Low-loss Y-branch Optical Waveguide," Fifth Optoelectronic and Communications Conference (OECC 2000) Technical Digest, pp. 502-503 (2000).

Padmini, P. et al. "Realization of High Tunability Barium Strontium Titanate Thin Films by rf Megnetron Sputtering," Appl. Phys. Lett. 75(20):3186-3188 (1999).

Pan, T. et al., "Planar $Er^{3+}$-doped aluminosilicate waveguide amplifier with more than 10 dB gain across C-band," Optical Society of America, 3 pages (2000).

Park et al., "Characteristics of Pt Thin Film on the Conducting Ceramics TiO and Ebonex ($Ti_4O_7$) as Electrode Materials," Thin Solid Films 258: 5-9 (1995).

Peters, D.P. et al., "Formation mechanism of silver nanocrystals made by ion irradiation of $Na^+$—$Ag^+$ ion-exchanged sodalime silicate glass," Nuclear Instruments and Methods in Physics Research B 168:237-244 (2000).

Rajarajan, M. et al., "Numerical Study of Spot-Size Expanders fro an Efficient OEIC to SMF Coupling," IEEE Photonics Technology Letters 10(8): 1082-1084 (1998).

Ramaswamy, R.V. et al., "Ion-Exchange Glass Waveguides: A Review," J. Lightwave Technology 6(6): 984-1002 (1988).

Roberts, S.W. et al., "The Photoluminescence of Erbium-doped Silicon Monoxide," University of Southampton, Department of Electronics and Computer Science Research Journal, 7 pages (1996).

Saha et al., "Large Reduction of Leakage Current by Graded-Layer La Doping in $(Ba0.5,Sr0.5)TiO3$ Thin Films," Appl. Phys. Lett. 79(1): 111-113 (Jul. 2001).

Sanyo Vacuum Industries Co., Ltd. Products Infor, $TiO_2$, (2003), 1 page, http://www.sanyovac.co.jp/Englishweb/products?ETiO2.htm.

Schermer, R. et al., "Investigation of Mesa Dielectric Waveguides," Proceedings of the OSA Integrated Photonics Research Topical Meeting and Exhibit, Paper No. IWB3, 3 pages (2001).

Schiller, S. et al., "PVD Coating of Plastic Webs and Sheets with High Rates on Large Areas," European Materials Research Society 1999 Spring Meeting, Jun. 1-4, 1999, Strasbourg, France, 13 pages (1999).

Scholl, R., "Power Supplies for Pulsed Plasma Technologies: State-of-the-Art and Outlook," Advances Energy Industries, Inc. 1-8 (1999).

Scholl, R., "Power Systems for Reactive Sputtering of Insulating Films," Advances Energy Industries, Inc., 1-8 (Aug. 2001).

Second International Symposium of Polymer Surface Modification: Relevance to Adhesion, Preliminary Program, 13 pages (1999).

Seventh International Conference on $TiO_2$ Photocatalysis: Fundamentals & Applications, Toronto, Ontario, Canada, Final Program, 7 pages (Nov. 17-21, 2002).

Sewell, P. et al., "Rib Waveguide Spot-Size Transformers: Modal Properties," J Lightwave Technology 17(5):848-856 (1999).

Shaw, D.G. et al., "Use of Vapor Deposited Acrylate Coatings to Improve the Barrier Properties of Metallized Film," Society of Vacuum Coaters, $37^{th}$ Annual Technical Conference Proceedings, pp. 240-244 (1994).

Shin, J.C. et al. "Dielectric and Electrical Properties of Sputter Grown $(Ba,Se)TiO_3$ Thin Films," J. Appl. Phys. 86(1):506-513 (1999).

Shmulovich, J. et al., "Recent progress in Erbium-doped waveguide amplifiers," Bell Laboratories, pp. 35-37 (1999).

Slooff, L.H. et al., "Optical properties of Erbium-doped organic polydentate cage complexes," J. Appl. Phys. 83(1):497-503 (1998).

Smith, R.E. et al., "Reduced Coupling Loss Using a Tapered-Rib Adiabatic-Following Fiber Coupler," IEEE Photonics Technology Lett. 8(8):1052-1054 (1996).

Snoeks, E. et al., "Cooperative upconversion in erbium-implanted soda-lime silicate glass optical waveguides," J. Opt. Soc. Am. B 12(8): 1468-1474 (1995).

Starner "Human-Powered Wearable Computing" 35(3&4) IBM Sys. J. 618-29 (1996)[1].

Strohhofer, C. and Polman, A. "Energy transfer to $Er^{3+}$ in Ag ion-exchanged glass," FOM Institute for Atomic and Molecular Physics, 10 pages (2001).

Sugiyama, A. et al., "Gas Permeation Through the Pinholes of Plastic Film Laminated with Aluminum Foil," Vuoto XXVIII(1-2):51-54 (1999).

Tervonen, A. "Challenges and opportunities for integrated optics in optical networks," SPIE 3620:2-11 (1999).

Ting, C.Y. et al., "Study of planarized sputter-deposited $SiO_2$," J. Vac. Sci Technol, 15(3):1105-1112 (1978).

Tomaszewski, H. et al., "Yttria-stabilized zirconia thin films grown by reactive r.f. magnetron sputtering," Thin Solid Films 287: 104-109 (1996).

Triechel, O. and Kirchhoff, V., "The influences of pulsed magnetron sputtering on topography and crystallinity of $TiO_2$ films on glass," Surface and Coating Technology 123:268-272 (2000).

Tukamoto, H. and West, A.R., "Electronic Conductivity of $LiCoO_s$ and Its Enhancement by Magnesium Doping," J. Electrochem. Soc 144(9):3164-3168 (1997).

Van Dover, R.B., "Amorphous Lanthanide-Doped $TiO_x$ Dielectric Films," Appl. Phys. Lett. 74(20):3041-3043 (1999).

Viljanen, J. and Leppihalme, M., "Planner Optical Coupling Elements for Multimode Fibers with Two-Step Ion Migration Process," Applied Physics 24(1):61-63 (1981).

Villegas, M.A. et al., "Optical spectroscopy of a soda lime glass exchanged with silver," Phys. Chem. Glasses 37(6):248-253 (1996).

Von Rottkay, K. et al., "Influences of stoichiometry on electrochromic cerium-titanium oxide compounds," Presented at the 11$^{th}$ Int'l Conference of Solid State Ionics, Honolulu, Hawaii, Nov. 19, 1997, Published in Solid State Ionics 113-115:425-430. (1998).

Wang, B. et al., "Characterization of Thin-Film Rechargeable Lithium Batteries with Lithium Cobalt Oxide Cathodes," J. Electrochem. Soc. 143:3203-13 (1996).

Westlinder, J. et al., "Simulations and Dielectric Characterization of Reactive de Magnetron Cosputtered $(Ta_2O_5)_{1-x}(TiO_2)_x$ Thin Films," J Vac. Sci. Technol. B 20(3):855-861 (May/Jun. 2002).

Wilkes, K.E., "Gas Permeation Through Vacuum Barrier Films and its Effect on VIP Thermal Performance," presented at the Vacuum Insulation Panel Symp., Baltimore, Maryland, 21 pages (May 3, 1999).

Yanagawa, H. et al., "Index-and-Dimensional Taper and Its Application to Photonic Devices," J. Lightwave Technology 10(5):587-591 (1992).

Yoshikawa, K. et al., "Spray formed aluminum alloys for sputtering targets," Powder Metallurgy 43(3): 198-199 (2000).

Zhang, H. et al., "High Dielectric Strength, High k $TiO_2$ Films by Pulsed DC, Reactive Sputter Deposition," 5 pages (2001).

Abraham, K.M. et al., "Inorganic-organic composite solid polymer electrolytes," 147(4) J. Electrochem. Soc. 1251-56 (2000).

Appetecchi, G.B. et al., "Composite polymer electrolytes with improved lithium metal electrode interfacial properties," 145(12) J. Electrochem. Soc. 4126-32 (1998).

Bates, J.B. et al., "Electrical properties of amorphous lithium electrolyte thin films," 53-56 Solid State Ionics 647-54 (1992).

Abrahams, I., "$Li_6Zr_2O_7$, a new anion vacancy ccp based structure, determined by ab initio powder diffraction methods," 104 J. Solid State Chem. 397-403 (1993).

Amatucci, G. et al., "Lithium scandium phosphate-based electrolytes for solid state lithium rechargeable microbatteries," 60 Solid State Ionics 357-65 (1993).

Yu, X. et al., "A stable thin-film lithium electrolyte: lithium phosphorus oxynitride," 144(2) J. Electrochem. Soc. 524-532 (1997).

Delmas, C. et al., "Des conducteurs ioniques pseudo-bidimensionnels $Li_8MO_6$ (M=Zr, Sn), $Li_7LO_6$ (L=Nb, Ta) et $Li_6In_2O_6$," 14 Mat. Res. Bull. 619-25 (1979).

Hu, Y-W. et al., "Ionic conductivity of lithium phosphate-doped lithium orthosilicate," 11 Mat. Res. Bull. 1227-30 (1976).

Neudecker, B. et al., "$Li_9SiAlO_8$: a lithium ion electrolyte for voltages above 5.4 V," 143(7) J. Electrochem. Soc. 2198-203 (1996).

Ohno, H. et al., "Electrical conductivity of a sintered pellet of octalithium zirconate," 132 J. Nucl. Mat. 222-30 (1985).

Scholder, V. et al., "Über Zirkonate, Hafnate und Thorate von Barium, Strontium, Lithium und Natrium," Zeitschrift für Anorganische und Allgemeine Chemie, Band 362, pp. 149-168 (1968).

Inaguma, Yoshiyuki, "High Ionic Conductivity in Lithium Lanthanum Titanate," Solid State Communications, vol. 86, No. 10, pp. 689-693 (1993).

Guy, D., "Novel Architecture of Composite Electrode for Optimization of Lithium Battery Performance," Journal of Power Sources 157, pp. 438-442 (2006).

Wolfenstine, J., "Electrical Conductivity and Charge Compensation in Ta Doped $Li_4Ti_5O_{12}$," Journal of Power Sources 180, pp. 582-585 (2008).

Balanis, Constantine A., "Antenna Theory: Analysis and Design," 3rd Ed., pp. 811-820 (2005).

Jones and Akridge, "A thin film solid state microbattery," Solid State Ionics 53-56 (1992), pp. 628-634.

* cited by examiner

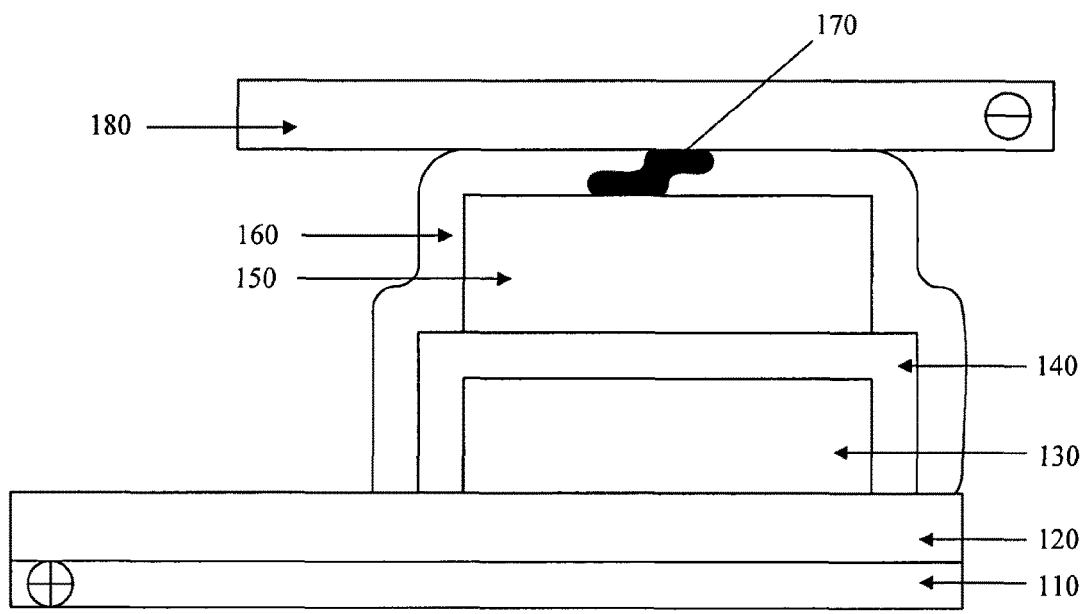
Figure 1
Figure 2A
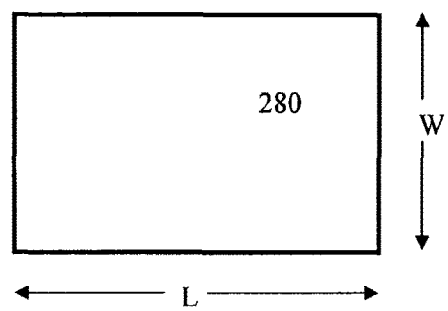
Figure 2 B
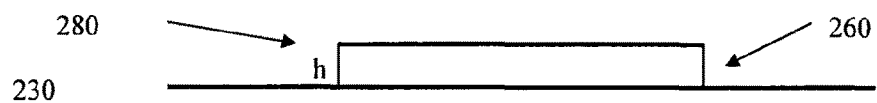

Figure 3A
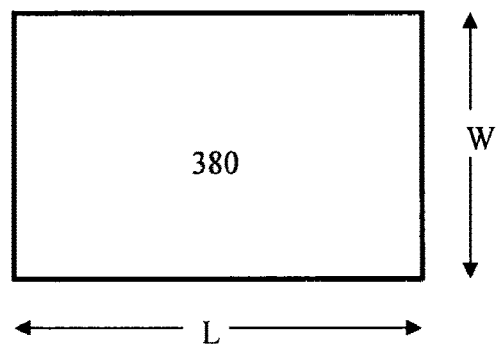
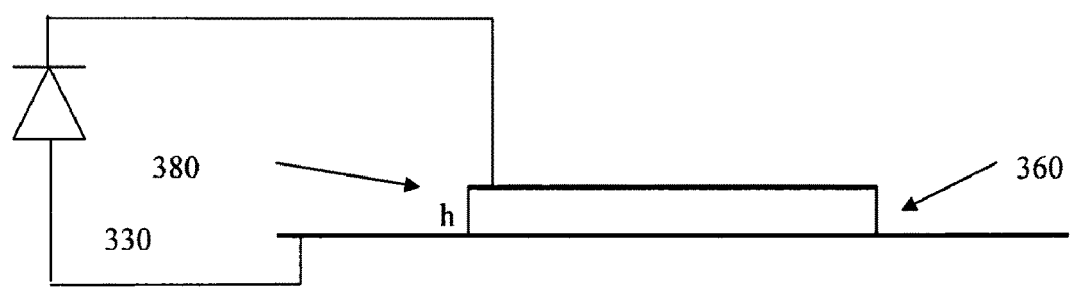
Figure 3B
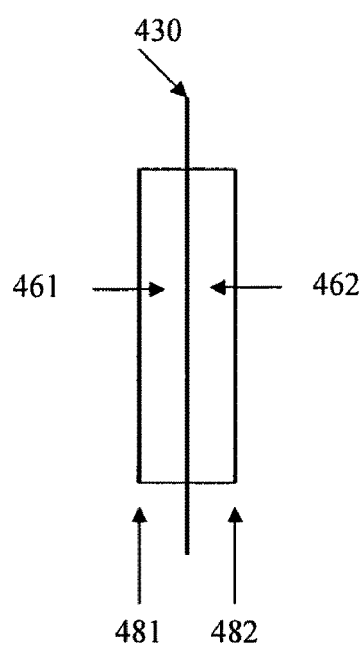
Figure 4

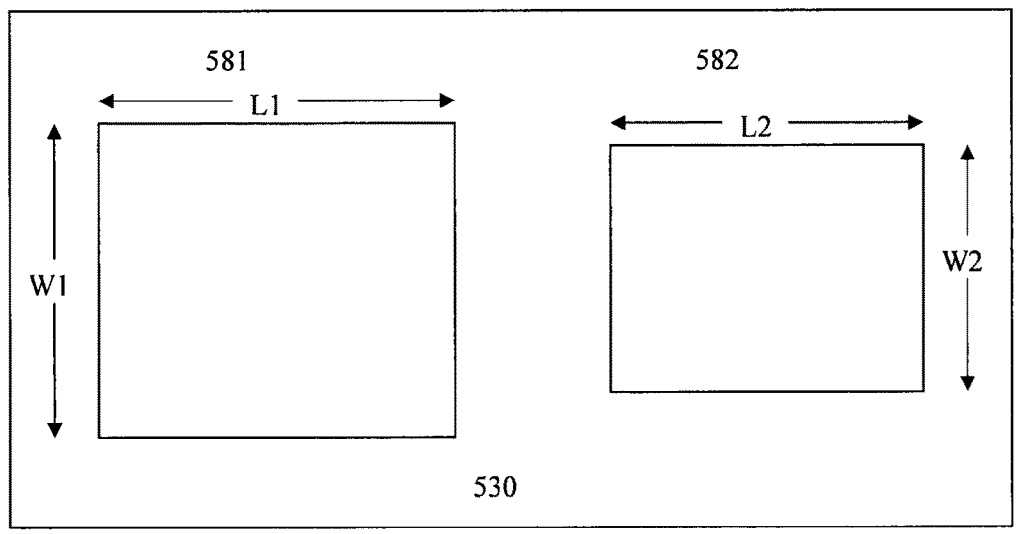
Figure 5
Figure 6
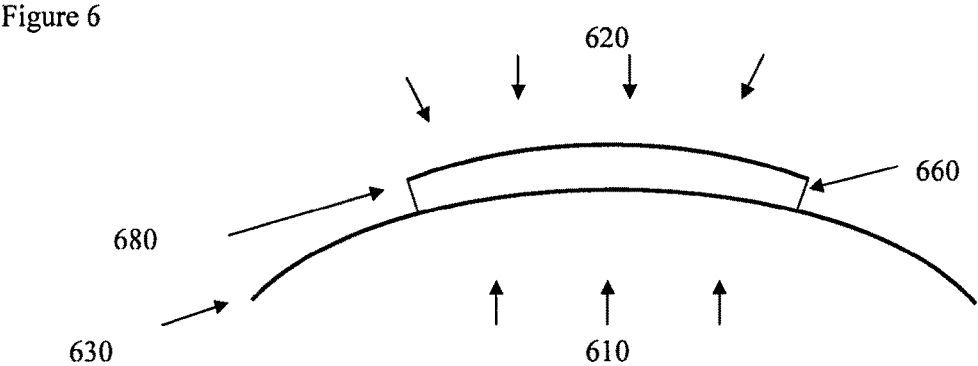

ENERGY DEVICE WITH INTEGRAL CONDUCTIVE SURFACE FOR DATA COMMUNICATION VIA ELECTROMAGNETIC ENERGY AND METHOD THEREOF

RELATED APPLICATIONS

This application is related to and claims the benefit under 35 U.S.C. §119 of U.S. Provisional Patent Application Ser. No. 61/096,415, entitled "Energy Device with Integral Conductive Surface for Data Communication Via Electromagnetic Energy and Method Thereof," filed on Sep. 12, 2008, which is incorporated herein by reference in its entirety.

TECHNICAL FIELD AND BACKGROUND OF THE INVENTION

This invention relates to an apparatus, system, and/or method of transmitting and receiving communications through RF or other electromagnetic signals. In particular, the present invention relates, for example, to the use of an energy generating or storing device that, may make use of at least one of its components to enable it to transmit and/or receive communications through RF or other electromagnetic signals.

Generally, systems have tended to be made up of separate components, each of which were redesigned to perform its own function with its own components, but not optimally designed for dual functionality of certain components or synergies within the system. Any reduction in size has been typically achieved by the reduction in size of the components.

Presently, as the need for electronic devices to become smaller is growing, designers are experiencing certain physical limitations in present designs, typically due to the limitations in the sizes of the components. This is particularly the case in wireless communications where it is often necessary for the size of the antenna be at least the length of one quarter of the wavelength of the transmitted signal.

SUMMARY OF INVENTION

It is one object of certain exemplary embodiments of this invention to operate by receiving wireless communications from the surrounding environment, or transmitting wireless communications into the surrounding environment, through a surface element that is either an existing or added layer of, for example, an energy storage or generation device. Various aspects and embodiments of the present invention, as described in more detail and by example below, address certain of the shortfalls of the background technology and emerging needs in the relevant field.

The present invention may include, for example, an apparatus, system, and method of transmitting and receiving communications through RF or other electromagnetic signals. In a preferred embodiment the invention may include at least one electrically conductive surface that is adapted to transmit or receive wireless communications.

An embodiment of the present invention may include, for example, a metallic or conductive surface within the energy storage component of an energy device (storage or generation) as an antenna to receive and/or transmit wireless communications. The conductive surface may preferably be an integral portion of the energy device, such as a charge collection surface within a battery (anode or cathode) or a capacitor that may provide the battery or a capacitor with another necessary function. The conductive surface may also be a casing or encapsulation of the energy device or an added layer to the energy device.

In another embodiment of the invention a metallic or conductive surface may be added to and specifically built into the energy device during manufacturing at least in part for the purpose of receiving and/or transmitting a wireless signal but may otherwise be unnecessary for the energy device.

Added features, patterns, or shapes may be applied to the conductive surface of an energy device to increase efficiency and/or capacity in the transmitting and/or receiving of wireless communications in a specific frequency band, broad band, or other energy applications. For certain embodiments, including, for example, certain flexible devices, the integral conductive surface may be curved (e.g., z-axis displacement) to enhance its antenna properties to, for example, enhance its directional reception characteristics.

BRIEF DESCRIPTION OF DRAWINGS

The accompanying drawings, which are included to provide a further understanding of the invention and is incorporated in and constitutes a part of this specification, illustrates an exemplary embodiment of the invention that, together with the description, serve to explain, but not limit, the principles of the invention.

FIG. 1 is a cross section of an embodiment of the present invention where the energy device is an energy storage component comprising an electrochemical cell.

FIG. 2A is a top down view of an embodiment of the present invention with the antenna on top.

FIG. 2B is a cross-sectional side view of an embodiment of the present invention.

FIG. 3A is a top down view of an embodiment of the present invention with the antenna on top and without adding a depiction of the substrate below it which might extend beyond the dimensions of the antenna.

FIG. 3B is a cross-sectional side view of an embodiment of the present invention adding a diode.

FIG. 4 is cross-sectional side view of an embodiment of an omni-directional array of the present invention.

FIG. 5 is a cross-sectional side view of an embodiment of a dual frequency array of the present invention.

FIG. 6 is a cross-sectional side view of an embodiment of a curved surface energy device used in an omni directional format of the present invention.

DETAILED DESCRIPTION OF PREFERRED EMBODIMENTS

Figure 7A:
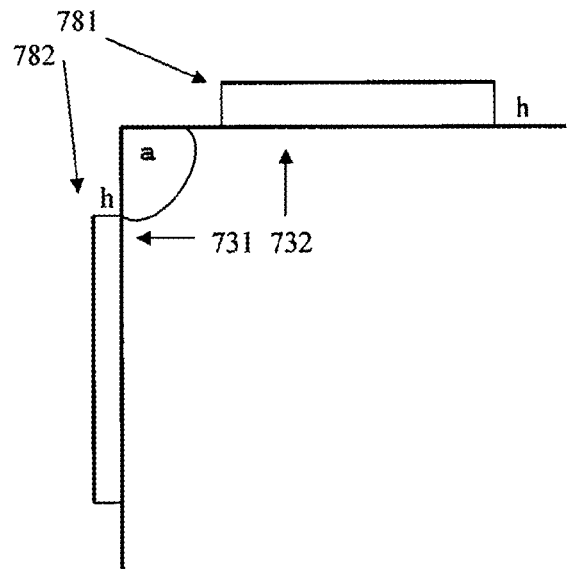
FIG. 7A is a cross-sectional top view of a multi-planar embodiment of the present invention.

It is to be understood that the present invention is not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art. Similarly, for another example, a reference to "a step" or "a means" is a reference to one or more steps or means and may include sub-steps or subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices and materials are described although any methods, techniques, devices, or materials similar or equivalent to those described may be used in the practice or testing of the present invention. Structures described herein are to be understood also to refer to functional equivalents of such structures.

All patents and other publications are incorporated herein by reference for the purpose of describing and disclosing, for example, the methodologies described in such publications that might be useful in connection with the present invention. These publications are provided solely for their disclosure prior to the filing date of the present application. Nothing in this regard should be construed as an admission that the inventors are not entitled to antedate such disclosure by virtue of prior invention or for any other reason.

This application is related to U.S. patent application Ser. No. 11/561,277, entitled "Hybrid Thin-Film Battery," filed on Nov. 17, 2006, which claims priority under 35 U.S.C. §119 to U.S. provisional patent applications Ser. No. 60/737,613, filed Nov. 17, 2005, Ser. No. 60/759,479, filed Jan. 17, 2006, and Ser. No. 60/782,792, filed Mar. 16, 2006; U.S. patent application Ser. No. 11/687,032, entitled "Metal Foil Encapsulation," filed on Mar. 16, 2007, which claims priority under 35 U.S.C. §119 to U.S. provisional patent application Ser. No. 60/782,792, filed Mar. 16, 2006; U.S. provisional patent application Ser. No. 61/087,927, entitled "Energy Device with Integral Collector Surface for Electromagnetic Energy Harvesting and Method Thereof," filed on Aug. 11, 2008, and U.S. patent application Ser. No. 12/539,327, entitled "Energy Device with Integral Collector Surface for Electromagnetic Energy Harvesting and Method Thereof," filed on Aug. 11, 2009, each of which are incorporated herein by reference in their entirety.

The present application further relates to U.S. patent application Ser. No. 11/209,536, entitled "Electrochemical Apparatus with Barrier Layer Protected Substrate," filed Aug. 23, 2005, which is a continuation of U.S. patent application Ser. No. 11/374,282 (converted from U.S. provisional patent application Ser. No. 60/690,697), entitled "Electrochemical Apparatus with Barrier Layer Protected Substrate," filed Jun. 15, 2005, which is a continuation-in-part of U.S. patent application Ser. No. 10/215,190, entitled "Methods of and Device for Encapsulation and Termination of Electronic Devices," filed Aug. 9, 2002, now U.S. Pat. No. 6,916,679, each of which is incorporated herein by reference in its entirety FIG. 1 shows a cross-sectional side view of one embodiment of the present invention. In this embodiment, the electrically conductive surface 180 forms part of the structure of the energy device. In the embodiment shown in FIG. 1, the energy device is an electrochemical cell having a cathode 130 and anode 150 separated by an electrolyte 140. This embodiment contains a barrier layer 120 and positive terminal substrate 110. An insulating layer 160 encapsulates the electrochemical cell with conductors 170 extending from anode 150 to the electrically conductive surface 180.

In one particular embodiment, the electrochemical cell is a thin film battery as disclosed in U.S. patent application Ser. No. 11/561,277 and previously incorporated in its entirety by reference. In this embodiment, from bottom to top, the device may, for example, contain a metal foil substrate 110 serving as a positive contact; a barrier layer 120 serving as a cathode current collector and preferably composed of, for example, a two conductor sub-layer; a cathode 130, preferably composed of, for example, Lithium Cobalt Oxide ($LiCoO_2$); a solid-state electrolyte 140 preferably made of, for example, LiPON; and an anode 150 preferably comprising Lithium. An insulating/adhesive layer 160 preferably made of, for example, a Surlyn layer that may cover the electrochemical device and a wire mesh conductor 170 may be woven between and in contact with the electrically conductive surface 180 and the electrochemical device.

As depicted, for example, in FIGS. 2A and 2B, the height of the dielectric 260 may conform to the thickness of a dielectric in a capacitor or a battery or the separating element in a battery or capacitor or a combination of both. It may, for example, represent a battery cathode thickness plus a separator material. Substrate 230 in FIG. 2B may be provided, for example, by the cathode current collector of a thin film battery. The antenna element 280 may, for example be provided by an anode current collector of a battery or a separate element. The dimensions for the various elements may be derived, for example, by extrapolating from the descriptions found in Antenna Theory, Analysis and Design, $2^{nd}$ edition, Constantine A. Balanis, 1982, 1997, ISBN 0-471-59268-4, incorporated herein in its entirety. The height of the dielectric (h), it's dielectric constant ($\in_r$), and the frequency of interest ($f_r$) may be adjusted by design. Once these values are set, the following equations may, for example, be used to optimize length, and appropriate width ratios. The lengths of the antenna may be some even division of wavelength ($\lambda$) such as $\lambda/2$, $\lambda/4$, $\lambda/8$, $\lambda/16$, and so forth. $V_0$ below is the velocity of light in free space.

$$W = \frac{1}{2} fr \sqrt{\mu_0 \in_0} * \sqrt{2/\in_r + 1} = v_0 / 2 fr * \sqrt{2/\in_r + 1}$$

$$L = [1/(2fr\sqrt{\in_{reff}}\sqrt{\mu_0 \in_0})] - 2\Delta L \text{ where } \in_{reff} \text{ is the effective dielectric:}$$

$$\in_{reff} = [(\in_r + 1)/2] + [(\in_r - 1)/2 * [1 + 12h/W]^{-1/2}$$

In addition to an electrochemical storage device such as a battery or thin film battery, the energy device may be an electrical storage device such as a capacitor or thin-film capacitor but may also be mechanical energy storage device, such as, for example, a flywheel, micro-flywheel, micro electro-mechanical system (MEMS), or a mechanical spring. The energy storage component may also be an electro-mechanical device, such as a piezo-electric element or a magneto-electric element, such as, for example, various embodiments of the invention disclosed in U.S. Pat. No. 7,088,031, entitled "Method and Apparatus for an Ambient Energy Battery or Capacitor Recharge System" which is herein incorporated by reference in its entirety. The energy storage component may also be a thermal energy storage device, such as a thermal mass container, or it may be a chemical energy storage device, such as, for example, a hydrogen generator with hydrogen container or an ozone generator with ozone container. Each one of these devices may be used to store energy based on certain exemplary elements of the system.

Further, the energy device may be an energy generating device. For example, the energy device may be an electric generator that is mechanically driven by an external force such as a moving fluid like wind, water, or steam, but may also be obtained from certain vibrations, as in a piezo-electric generator, or the thermal expansion of a material, such as in a Sterling engine. The energy device may also generate energy using the method of a fuel cell, thermal-electric generator, atomic particle electric generator, photovoltaic cell, and magnetostrictive and magnetostrictive-electroactive generators, depending on the application for the device.

Similarly, the material and geometry of the electrically conductive surface may vary depending on the system application. In a preferred embodiment, the electrically conductive surface has suitable electromagnetic impedance that is adapted to the frequencies of the transmitted and/or received wireless signals. In some embodiments, the electrically conductive surface may be made of metals, alloys, semiconductors, conductive organics, and polymers, and conductive composites. The device may also be flexible, for example, and made to be wound upon itself or other objects in order to better transmit and/or receive certain types of wireless signals. The electrically conductive surface may extend beyond the other components of the energy device but also may wrap around the energy device one or more times and in one or more directions.

In several embodiments, the antenna may also be an integral part of the energy device. For example, an antenna may be embodied by the anode of an electrochemical storage device, the anode current collector of an electrochemical storage device, the cathode of an electrochemical storage device, the cathode current collector of an electrochemical storage device, the encapsulation of an electrochemical storage device, the substrate of an electrochemical storage device, the casing of an electrochemical storage device, the negative electrode of a capacitor, the positive electrode of a capacitor, the casing of a capacitor, the casing of a mechanical energy storage device, a mechanical spring, a metal frame of a flywheel, the electrodes of a piezo-electric element, the wiring of a magneto-electric element, the electrodes of a micro electro-mechanical system (MEMS), or the casing of a thermal energy storage device. In the case of an energy generating device, the antenna may also be the casing of a fuel cell, the electrodes of a fuel cell, the electrical interconnects between fuel cells, the casing of hydrogen generator with hydrogen container, the casing of an ozone generator with ozone container, the electrodes in a Peltier electric generator, the electrically and thermally conductive heat sinks within a Peltier electric generator, the casing of Peltier electric generator, the electrodes in an atomic particle generator, the casing of an atomic particle generator, the collectors in a magnetostrictive generator, and/or the casing of a magnetostrictive generator.

In some embodiments where the electrically conductive surface is integral to the energy device, the surface may be, for example, structurally or chemically modified beyond the primary functional need of said energy device so as to optimize the adaptation of said surface to the reception and/or transmission of wireless signals. Structural modifications may include enlarging, reducing, or modifying the surface area of one or more surfaces by expanding, stretching, increasing, or otherwise extending, decreasing, or optimizing the surface to tune it for the desired frequency or wavelength. For example in the energy device of FIG. 1 the surface 180 may be expanded, extended, or otherwise increased in shape. Similarly, surface 110, 170, or any other conductive surface may, for example, be modified to extend or reduce the surface area to improve receiving and/or transmitting a wireless signal of that or those elements alone or in combination. Additionally, these conductive surfaces may be increased in thickness or perforated in any preferable direction to increase surface area, geometry of these device elements.

The electrically conductive surface in various embodiments may be designed to be able to receive and/or transmit wireless signals in one or more particular forms. Such forms may, for example, include electrical field coupled energy, magnetic field coupled energy, light wave direct coupled energy, light wave thermally coupled energy, laser or coherent light coupled energy, sub-millimeter wavelength radiation coupled energy, broad band frequency, narrow band frequency, directed energy, indirect energy, ultra low frequency, super low frequency, very low frequency, low frequency, medium frequency, high frequency, very high frequency, ultra high frequency, super high frequency, extremely high frequency, infra red light frequency, visible light frequency, ultra violet light frequency, and x-ray frequency.

In some embodiments, the electrically conductive surface or other electrically conductive surfaces may serve the additional purpose of collecting energy to charge an energy storage device and/or reduce the power requirements of an energy generation device to supply energy to a given load. Electromagnetic energy harvesting may be performed solely, or in conjunction with another source of power, such as, for example, a solar cell or solar thermal collector. Such a combination would, for example, allow for an autonomous electrical circuit to operate with or without sunlight in an environment containing electromagnetic energy for an extended period of time.

FIGS. 3A and 3B depict an embodiment of the invention providing a diode between an antenna surface 380 and conductive substrate surface 330. As described by example above, the antenna element 380 may, for example be provided by an anode current collector of a battery or a separate element. Dielectric 360 may be representative of the dielectric in a capacitor or a battery or the separating element in a battery or capacitor or a combination of both. It may, for example, represent a battery cathode thickness plus a separator material. Substrate 330 in FIG. 3B may be provided, for example, by the cathode current collector of a thin film battery. Direct charging of the energy storage device may be accomplished, for example, by connecting a diode between the antenna surface and the conductive substrate surface. This connection may be of the cathode of the diode attached to the antenna surface 380 and the anode of the diode connected to the substrate surface 330. The diode may be an integral portion of the manufactured energy storage device or an external discreet component.

Additional components may also be included in certain embodiments of the present invention. For example, an embodiment of the present invention may include one or more electrical components for rectifying the alternating current induced onto an electrically conductive energy collecting surface into a direct current so that it may be easily stored in, for example, an energy storage device. These components may, for example, be external to the energy storage component, however they may also alternatively or additionally be imbedded within the energy storage component. For example, the semiconductor characteristics of Lithium Cobalt Oxide, which may be used as a component of an electrochemical cell and may be n-type and p-type doped in certain regions, thereby creating devices with diode characteristics, which may be configured to operate as a rectifier. Further, other electronic components may be formed on a Lithium Cobalt Oxide or other similar semiconductor substrates that may form electronic circuits.

A system for transmitting and/or receiving wireless signals is also, for example, provided by various disclosures herein. This system may for example include a plurality of transmitting/receiving devices connected together electrically, mechanically, or wirelessly to form an array. The arrangement of devices within the array may vary to, for example, optimize the transmission and/or reception of wireless signals in an omni-directional or uni-directional manner. The wireless communication devices themselves may vary within a single system, for example, to optimize the reception and/or transmission of varying wavelengths—this may include the shape and size of the electrically conductive surface, but also the type of material. Further, the interconnection of the wireless communication devices may be arranged in series or parallel, for example, to create certain signal outputs.

Certain embodiments of the present invention may include a plurality of devices connected together into the form of an array. The arrangement of devices within the array may vary to, for example, optimize the collection of electromagnetic energy and/or including electromagnetic signals in an omni-directional or uni-directional manner. The energy storage devices themselves may vary within a single system, for example, to optimize the collection of electromagnetic energy and/or signals of varying wavelengths—this may include the shape and size of the electrically conductive surface, but also the type of material. Further, the interconnection of the energy storage devices may be arranged in series or parallel, for example, to create certain voltage outputs. One example of an omni-directional array, as depicted in FIG. 4, provides for two substrates 430 to be placed together and the collection surfaces 481 and 482 to be directed outwardly. Dielectric layers 461 and 462 are provided between the substrate 430 and collection surfaces 481 and 482. Alternatively, a substrate with a battery or other energy storage device may be placed on either side of the substrate. Multiple surfaces of various configurations may also be provided. A multi-frequency array may be provided, for example as depicted in FIG. 5 by providing two energy storage devices 581, 582, possibly with differing L/W ratios, for example, on one or more substrates 530. Multiple surfaces and/or devices may also be provided in various embodiments. Alternatively, the top of a single cell may be provided with an insulator/conductor patterned top that electrically "looks" like the arrangement of FIG. 5, providing a multi-frequency antenna with no external alteration because the battery substrate would "look" like the total substrate in the figure. FIG. 6 provides one example of a curved surface energy device that may be used in an omni directional format. The curve may be used to create a receiving surface that is, for example, some portion of a sphere to allow gathering energy and/or signals 610 and/or 620 as shown coming from the bottom or top of the drawing. As discussed, by way of example above, a diode may similarly be integrated into this exemplary design. Further, an antenna element 680, dielectric element 660 and substrate element 630 may be provided, for example, as shown.

Figure 7B:
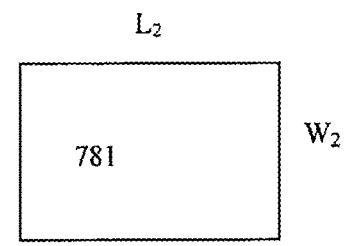
FIG. 7B is a side view of one device of a multi-planar embodiment of the present invention.
Figure 7C:
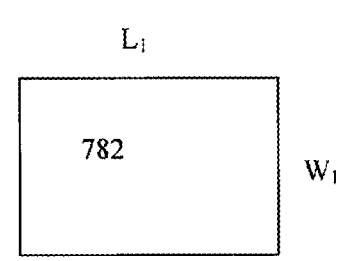
FIG. 7C is a side view from a different angle of a second device of a multi-planar embodiment of the present invention.

An example of a multi-planar embodiment of the present invention is set forth, for example, in FIGS. 7A, 7B, and 7C. In this example, two or more devices (depicted in FIG. 7A as 781, 782) may be arranged at an angle a to each other. These devices may be built on separate substrates (depicted as 731 and 732 in FIG. 7A) or on one substrate that is formed at the appropriate angle either during manufacturing or as a post process step. The angle a may be any angle, and may, for example range from 0° to 180°. The length, width and height values (L, W, and h), and ratio's for these values, for any given frequency, group of frequencies, or any pair of frequencies or bands may be identical or entirely different. Additionally, diode rectification may be performed on this or these embodiments similarly to a single plane device wherein a diode may be provided, for example, across each antenna/substrate.

This system may be used, for example, as a wireless signal listening device, tuned to a plurality of frequencies, and collecting transmitted information and/or performing a function, such as, for example, transmitting a signal, based on certain information that is received. The system may also be used, for example, as a wireless receiver component to an autonomous electrical circuit which, upon receiving a wireless command signal, performs a function.

This invention has been described herein in several embodiments. It is evident that there are many alternatives and variations that can embrace the performance of ceramics enhanced by the present invention in its various embodiments without departing from the intended spirit and scope thereof. The embodiments described above are exemplary only. One skilled in the art may recognize variations from the embodiments specifically described here, which are intended to be within the scope of this disclosure. As such, the invention is limited only by the following claims. Thus is intended that the present invention cover the modifications of this invention provided they come within the scope of the appended claims and their equivalents.

What is claimed is:

1. An energy device for transmitting and/or receiving wireless signals, comprising:
    an energy component, and
    at least one electrically conductive surface that is an integral part of said energy component,
    wherein said at least one electrically conductive surface comprises at least one electrically conductive protrusion extending therefrom in the direction parallel to the component layers and wherein said at least one conductive surface is adapted to receive and/or transmit wireless signals.

2. The energy device of claim 1, wherein said energy component comprises an energy storage device comprising any device from the group of: electrochemical energy storage device, electrical energy storage device, magnetic energy storage device, mechanical energy storage device, electro-mechanical energy storage device, magneto-electric energy storage device, thermal energy storage device, and chemical energy storage device.

3. The energy device of claim 2, wherein said energy storage device comprises components selected from the group of: battery, thin-film battery, capacitor, thin-film capacitor, piezo-electric element, magneto-electric element, thermal mass container, flywheel, micro-flywheel, micro electro-mechanical system (MEMS), mechanical spring, hydrogen generator with hydrogen container, and ozone generator with ozone container.

4. The energy device of claim 1, wherein said energy component comprises an energy generation device comprising any device from the group of: electric generator, chemical energy generating device, fuel cell, hydro electric generator, thermal-electric generator, piezo-electric generator, Peltier junction thermal electric generator, atomic particle to electric generator, light to electric generator, light to thermal generator, magneto-strictive generator, and magneto-strictive-electroactive generator.

5. The energy device of claim 1, wherein said energy component comprises a geometrical shape selected from the group of square, rectangular, triangular, multi-sided polygonal, round, curved, wavy, and non-uniform in thickness.

6. The energy device of claim 1, wherein said at least one electrically conductive surface comprises an electromagnetic impedance that is adapted to the frequencies of the wireless signals to be transmitted and/or received.

7. The energy device of claim 1, wherein said at least one electrically conductive surface comprises a material selected from the group of: the anode of an electrochemical storage device, the anode current collector of an electrochemical storage device, the cathode of an electrochemical storage device, the cathode current collector of an electrochemical storage device, the encapsulation of an electrochemical storage device, the substrate of an electrochemical storage device, the casing of an electrochemical storage device, the negative electrode of a capacitor, the positive electrode of a capacitor, the casing of a capacitor, the casing of a mechanical energy storage device, a mechanical spring, the metal frame of a flywheel, the casing of an electro-mechanical device, the electrodes of a piezo-electric element, the wiring of a magneto-electric element, the electrodes of a micro electro-mechanical system (MEMS), the casing of a thermal energy storage device, the casing of a chemical energy storage device, the casing of a fuel cell, the electrodes of a fuel cell, the electrical interconnects of between fuel cells, the casing of hydrogen generator with hydrogen container, the casing of an ozone generator with ozone container, the electrodes in a Peltier electric generator, the electrically and thermally conductive heat sinks within a Peltier electric generator, the casing of Peltier electric generator, the electrodes in an atomic particle generator, the casing of an atomic particle generator, the collectors in a magnetostrictive generator, and the casing of a magnetostrictive generator.

8. The energy device of claim 1, wherein said at least one electrically conductive surface comprises a geometrical shape selected from the group of square, rectangular, triangular, multi-sided polygonal, round, curved, wavy, and non-uniform in thickness.

9. The energy device of claim 1, wherein said at least one electrically conductive surface is structurally or chemically modified beyond its primary functional need by said energy component, whereby said modification causes an increase in the ability of said surface to receive and/or transmit wireless signals.

10. The energy device of claim 9, wherein said at least one electrically conductive surface has a thickness that is greater than that of said energy component.

11. The energy device of claim 9, wherein said at least one electrically conductive surface comprises a surface area having a length in at least one horizontal direction greater than the length of said energy component.

12. The energy device of claim 1, wherein said at least one electrically conductive surface has a thickness that is greater than that of said energy component.

13. The energy device of claim 1, wherein said at least one electrically conductive surface comprises a surface area having a length in at least one horizontal direction greater than the length of said energy component.

14. The energy device of claim 1, wherein said at least one electrically conductive surface comprises a material selected from the group of: metals, alloys, semiconductors, conductive organics and polymers, and conductive composites.

15. The energy device of claim 1, wherein the shape of said device is selected from the group of: square, rectangular, triangular, multi-sided polygonal, round, curved, wavy, and non-uniform in thickness.

16. The energy device of claim 1, wherein the wireless signal comprises electromagnetic energy selected from the group of: electrical field coupled energy, magnetic field coupled energy, light wave direct coupled energy, light wave thermally coupled energy, laser or coherent light coupled energy, and sub-millimeter wavelength radiation coupled energy.

17. The energy device of claim 1, wherein the wireless signal is selected from the group comprising: broad band frequency, narrow band frequency, directed energy, indirect energy, ultra low frequency, super low frequency, very low frequency, low frequency, medium frequency, high frequency, very high frequency, ultra high frequency, super high frequency, extremely high frequency, infra red light frequency, visible light frequency, ultra violet light frequency, and x-ray frequency.

18. An energy device for transmitting and/or receiving wireless signals, comprising:
an energy component, and
at least one electrically conductive surface that is an integral part of said energy component,
wherein said at least one electrically conductive surface comprises at least one electrically conductive protrusion extending therefrom in the direction orthogonal to the component layers and wherein said at least one conductive surface is adapted to receive and/or transmit wireless signals.

19. The energy device of claim 18, wherein said energy component comprises an energy storage device comprising any device from the group of: electrochemical energy storage device, electrical energy storage device, magnetic energy storage device, mechanical energy storage device, electro-mechanical energy storage device, magneto-electric energy storage device, thermal energy storage device, and chemical energy storage device.

20. The energy device of claim 19, wherein said energy storage device comprises components selected from the group of: battery, thin-film battery, capacitor, thin-film capacitor, piezo-electric element, magneto-electric element, thermal mass container, flywheel, micro-flywheel, micro electro-mechanical system (MEMS), mechanical spring, hydrogen generator with hydrogen container, and ozone generator with ozone container.

21. The energy device of claim 18, wherein said energy component comprises an energy generation device comprising any device from the group of: electric generator, chemical energy generating device, fuel cell, hydro electric generator, thermal-electric generator, piezo-electric generator, Peltier junction thermal electric generator, atomic particle to electric generator, light to electric generator, light to thermal generator, magneto-strictive generator, and magneto-strictive-electroactive generator.

22. The energy device of claim 18, wherein said energy component comprises a geometrical shape selected from the group of square, rectangular, triangular, multi-sided polygonal, round, curved, wavy, and non-uniform in thickness.

23. The energy device of claim 18, wherein said at least one electrically conductive surface comprises an electromagnetic impedance that is adapted to the frequencies of the wireless signals to be transmitted and/or received.

24. The energy device of claim 18, wherein said at least one electrically conductive surface comprises a material selected from the group of: the anode of an electrochemical storage device, the anode current collector of an electrochemical storage device, the cathode of an electrochemical storage device, the cathode current collector of an electrochemical storage device, the encapsulation of an electrochemical storage device, the substrate of an electrochemical storage device, the casing of an electrochemical storage device, the negative electrode of a capacitor, the positive electrode of a capacitor, the casing of a capacitor, the casing of a mechanical energy storage device, a mechanical spring, the metal frame of a flywheel, the casing of an electro-mechanical device, the electrodes of a piezo-electric element, the wiring of a magneto-electric element, the electrodes of a micro electro-mechanical system (MEMS), the casing of a thermal energy storage device, the casing of a chemical energy storage device, the casing of a fuel cell, the electrodes of a fuel cell, the electrical interconnects of between fuel cells, the casing of hydrogen generator with hydrogen container, the casing of an ozone generator with ozone container, the electrodes in a Peltier electric generator, the electrically and thermally conductive heat sinks within a Peltier electric generator, the casing of Peltier electric generator, the electrodes in an atomic particle generator, the casing of an atomic particle generator, the collectors in a magnetostrictive generator, and the casing of a magnetostrictive generator.

25. The energy device of claim 18, wherein said at least one electrically conductive surface comprises a geometrical shape selected from the group of square, rectangular, triangular, multi-sided polygonal, round, curved, wavy, and non-uniform in thickness.

26. The energy device of claim 18, wherein said at least one electrically conductive surface is structurally or chemically modified beyond its primary functional need by said energy component, whereby said modification causes an increase in the ability of said surface to receive and/or transmit wireless signals.

27. An energy device for transmitting and/or receiving wireless signals, comprising:
    an energy component, and
    at least one electrically conductive surface that is an integral part of said energy component,
    wherein said at least one conductive surface is adapted to receive and/or transmit wireless signals and is structurally or chemically modified beyond its primary functional need by said energy component, whereby said modification causes an increase in the ability of said surface to receive and/or transmit wireless signals, and
    wherein said at least one electrically conductive surface comprises at least one electrically conductive protrusion extending therefrom in the direction about parallel to the component layers.

28. An energy device for transmitting and/or receiving wireless signals, comprising:
    an energy component, and
    at least one electrically conductive surface that is an integral part of said energy component,
    wherein said at least one conductive surface is adapted to receive and/or transmit wireless signals and is structurally or chemically modified beyond its primary functional need by said energy component, whereby said modification causes an increase in the ability of said surface to receive and/or transmit wireless signals, and
    wherein said at least one electrically conductive surface comprises at least one electrically conductive protrusion extending therefrom in the direction about orthogonal to the component layers.

29. An energy device for transmitting and/or receiving wireless signals, comprising:
    an energy component, and
    at least one electrically conductive surface incorporated into said device during the manufacture of said device as an added component that is an integral part of said energy component,
    wherein said at least one conductive surface is adapted to receive and/or transmit wireless signals.

30. The energy device of claim 29, further comprising said at least one electrically conductive surface comprising an external antenna.

31. An energy device for transmitting and/or receiving wireless signals, comprising:
    an energy component,
    at least one electrically conductive surface that is an integral part of said energy component,
    wherein said at least one conductive surface is adapted to receive and/or transmit wireless signals, and
    at least one external element that improves the reception and/or transmission of the wireless signal and wherein said external element is selected from the group of: external diode, rectenna consisting of said external diode and said at least one electrically conductive surface, external full bridge rectifier, external half bridge rectifier, and external reactive components, wherein said external reactive components are any combination of capacitors, coils, diodes, transistors, RF chokes, and integrated devices.

32. An energy device for transmitting and/or receiving wireless signals, comprising:
    an energy component,
    a first electrically conductive surface that is an integral part of said energy component,
    wherein said at least one conductive surface is adapted to receive and/or transmit wireless signals, and
    a second electrically conductive surface that, in combination with said first electrically conductive surface, are adapted to form an array which provides an improved transmission and/or reception of wireless signals.

33. The energy device of claim 32, wherein said array is adapted to provide an improved transmission and/or reception of said wireless signals in an omni-directional response.

34. The energy device of claim 32, wherein said array is adapted to provide an improved transmission and/or reception of said wireless signals in an uni-directional response.

35. The energy device of claim 32, wherein said plurality of electrically conductive surfaces comprises a connection in series and/or in parallel that are adapted to transmit and/or receive wireless signals.

36. The energy device of claim 32, wherein all electrically conductive surfaces comprise substantially equal size and shape.

37. The energy device of claim 32, wherein at least one of said electrically conductive surfaces comprises a substantially different size and shape than the other electrically conductive surfaces.

38. An energy device for transmitting and/or receiving wireless signals, comprising:
    more than one energy component,
    a first electrically conductive surface that is an integral part of one of said energy components,
    wherein said at least one conductive surface is adapted to receive and/or transmit wireless signals, and
    wherein said more than one energy components are connected in series and/or in parallel.

39. The energy device of claim 38, wherein all energy components comprise substantially the same size and shape.

40. The energy device of claim 38, wherein at least one of said energy components comprise a substantially different size and shape than the other energy components.

41. An array comprising a plurality of energy devices for transmitting and/or receiving wireless signals, each energy device comprising:
    an energy component, a first electrically conductive surface that is an integral part of said energy component, wherein said at least one conductive surface is adapted to receive and/or transmit wireless signals, and wherein said energy devices are connected in series and/or in parallel.

42. The array of claim 41, wherein all energy devices comprise substantially equal size and shape.

43. The array of claim 41, wherein at least one of said energy devices comprise a substantially different size and shape than the other energy devices.

44. A method of transmitting and/or receiving wireless signals of electromagnetic energy comprising:

providing at least one energy device within range of a wireless signal, said device comprising an electrically conductive surface and an energy component, wherein said electrically conductive surface is an integral part of said energy component and wherein said at least one conductive surface is adapted to receive and/or transmit wireless signals;

wherein said at least one electrically conductive surface comprises at least one electrically conductive protrusion extending therefrom in the direction parallel to the component layers; and transmitting and/or receiving a wireless signal across said electrically conductive surface.

45. The method of claim 44, further comprising modifying the geometry and/or chemical make-up of said electrically conductive surface beyond its primary functional need by said energy component to improve the transmitting and/or receiving of wireless signals.

46. The method of claim 44, further comprising receiving a control signal to an autonomous electrical device.

47. A method of transmitting and/or receiving wireless signals of electromagnetic energy comprising, comprising:

providing at least one energy device within range of a wireless signal, said device comprising an electrically conductive surface and an energy component, wherein said electrically conductive surface is an integral part of said energy component and wherein said at least one conductive surface is adapted to receive and/or transmit wireless signals;

wherein said at least one electrically conductive surface comprises at least one electrically conductive protrusion extending therefrom in the direction orthogonal to the component layers; and; and transmitting and/or receiving wireless signals across said electrically conductive surface.

48. The method of claim 47, further comprising modifying the geometry and/or chemical make-up of said electrically conductive surface to improve the transmitting of wireless signals.

49. The method of claim 47, further comprising receiving a control signal to an autonomous electrical device.

50. A method of tuning the transmission and/or reception of wireless signals of a wireless communication device for a known signal, comprising:

providing an energy component, and providing at least one electrically conductive surface that is an integral part of said energy component, wherein said at least one conductive surface is adapted to receive and/or transmit wireless signals, and providing said energy component within range of a wireless signal, wherein said electrically conductive surface has a first surface area and a first thickness for a first known transmission and/or reception signal.

51. The method of claim 50, further comprising increasing the surface area of the electrically conductive surface in at least one horizontal direction to a second surface area.

52. The method of claim 50, further comprising increasing the thickness of the electrically conductive surface to a second thickness.

53. The method of claim 50, further comprising providing a plurality of electromagnetically conductive surfaces.

54. The method of claim 53, further comprising configuring at least two of the plurality of conductive surfaces into an array to improve the transmission of wireless signals.

55. The method of claim 53, further comprising configuring at least two of the plurality of conductive surfaces into an array to improve reception of wireless signals.

* * * * *

UNITED STATES PATENT AND TRADEMARK OFFICE
CERTIFICATE OF CORRECTION

| | | |
|---|---|---|
| PATENT NO. | : 8,260,203 B2 | Page 1 of 1 |
| APPLICATION NO. | : 12/556880 | |
| DATED | : September 4, 2012 | |
| INVENTOR(S) | : Paul C. Brantner | |

It is certified that error appears in the above-identified patent and that said Letters Patent is hereby corrected as shown below:

Col. 9, line 43, change "9" to --1--.

Col. 9, line 46, change "9" to --1--.

Signed and Sealed this
Eleventh Day of December, 2012

David J. Kappos
*Director of the United States Patent and Trademark Office*